United States Patent
Ueno et al.

(10) Patent No.: US 6,483,609 B1
(45) Date of Patent: Nov. 19, 2002

(54) IMAGE PROCESSING SYSTEM, IMAGE PROCESSING METHOD, IMAGE TRANSMITTING SYSTEM, AND IMAGE TRANSMITTING METHOD

(75) Inventors: Kunikazu Ueno, Ebina (JP); Masayuki Hisatake, Ebina (JP); Shinichi Saito, Ebina (JP); Manabu Ushikubo, Ebina (JP); Kanako Hayashi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/188,142

(22) Filed: Nov. 9, 1998

(30) Foreign Application Priority Data

Nov. 18, 1997 (JP) .............................. 9-317162

(51) Int. Cl.$^7$ ............................... H04N 1/00
(52) U.S. Cl. .................. 358/434; 358/1.2; 358/1.9; 358/467; 382/232; 382/240; 382/298
(58) Field of Search .................. 358/434, 1.2, 1.9, 358/467; 382/232, 243, 235, 240, 298, 299, 302

(56) References Cited

U.S. PATENT DOCUMENTS

| | | | |
|---|---|---|---|
| 5,113,492 A | * 5/1992 | Ariki et al. | |
| 5,235,436 A | * 8/1993 | Sakamoto et al. | 358/462 |
| 5,363,219 A | * 11/1994 | Yoshida | 358/400 |
| 5,438,432 A | * 8/1995 | Koue et al. | |
| 5,717,506 A | * 2/1998 | Yamamoto et al. | 358/523 |
| 5,751,857 A | * 5/1998 | Kobayashi | 382/232 |
| 5,778,092 A | * 7/1998 | Macleod et al. | |
| 5,781,666 A | * 7/1998 | Ishizawa et al. | 382/284 |
| 5,862,257 A | * 1/1999 | Sekine et al. | 382/199 |
| 5,889,927 A | * 3/1999 | Suzuki | 395/102 |
| 5,978,522 A | * 11/1999 | Ishii et al. | 382/299 |
| 5,982,937 A | * 11/1999 | Accad | |
| 6,072,941 A | * 6/2000 | Suzuki et al. | |
| 6,147,770 A | * 11/2000 | Unishi et al. | 358/1.2 |
| 6,172,717 B1 | * 1/2001 | Ebihara | 349/586 |
| 6,215,904 B1 | * 4/2001 | Lavallee | 382/234 |
| 6,226,421 B1 | * 5/2001 | Monji | 382/300 |
| 6,324,305 B1 | * 11/2001 | Holladay et al. | |
| 6,334,001 B2 | * 12/2001 | de Queiroz et al. | |

FOREIGN PATENT DOCUMENTS

| | | | | |
|---|---|---|---|---|
| JP | A-63-308474 | * 12/1988 | ............ | H04N/1/41 |
| JP | A-2-267678 | * 11/1990 | ........... | G06F/15/70 |
| JP | 04-088750 | * 3/1992 | | |
| JP | A-4-354263 | * 12/1992 | ............ | H04N/1/41 |
| JP | A-5-14701 | * 1/1993 | ............ | H04N/1/41 |
| JP | A-5-114045 | * 5/1993 | ............ | G06K/9/20 |
| JP | 05-167833 | * 7/1993 | | |
| JP | 05-342314 | * 12/1993 | | |
| JP | 09-081763 | * 3/1997 | | |

* cited by examiner

Primary Examiner—Edward Coles
Assistant Examiner—Tia Carter
(74) Attorney, Agent, or Firm—Oliff & Berridge, PLC

(57) ABSTRACT

A scanner 1 reads image information at read resolution set by a resolution control section 3 and stores the image information in memory 2. An image separation section 11 separates the image information into a first image plane (picture part), a second image plane (text part color information), and a selection image plane (text part forms) for selecting either the first or second image plane. The resolution control section 3 sets optimum resolutions in first to third resolution conversion sections 12–14 in response to image quality, the original type, the system environment, the image plane characteristics, etc. The three image planes are converted into the resolutions set in the first to third resolution conversion sections 12–14. The image planes after undergoing the resolution conversion are compressed in first to third compression sections 15–17 and wrapped in one data format by an image format section 18.

26 Claims, 19 Drawing Sheets

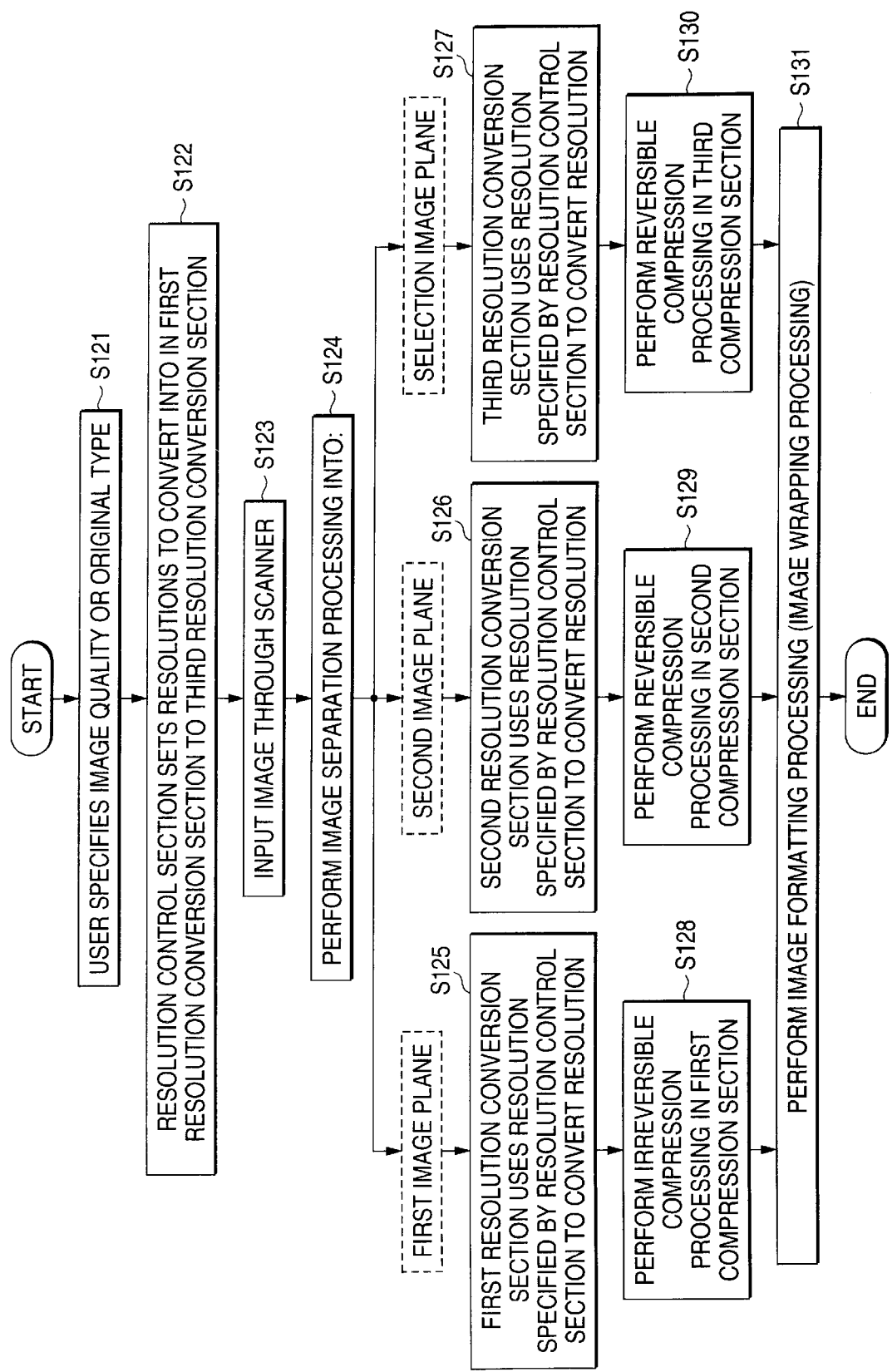

IMAGE PROCESSING SYSTEM, IMAGE PROCESSING METHOD, IMAGE TRANSMITTING SYSTEM, AND IMAGE TRANSMITTING METHOD

BACKGROUND OF THE INVENTION

This invention relates to an image transmitting system and an image transmitting method for transmitting image data with high quality over a network line such as a public line or a LAN (local area network) line and an image processing system and an image processing method suitably used for transmitting image data in such a manner and storing high-quality image data. Further, the present invention also relates to color facsimile machines, or to transmission/reception of images of the Internet.

Hitherto, image data has been transmitted and stored increasingly. For example, monochrome binary image data is MR, MMR coded, etc., then transmitted or stored with a machine typified by normal G3, G4 facsimile. Various means such as an orthogonal transformation coding transmission technique typified in the Unexamined Japanese Patent Application Publication No. Sho 63-308474, etc., for example, are also proposed for color images. In either case, basically, an input image is handled as one plane and is compressed, then transmitted or stored.

Processing responsive to the image structure of each part of an image, such as text or picture, is also performed. For example, to transmit binary data (monochrome facsimile image), simple binarization processing is performed for a text part and dither. binarization processing is performed for a picture part, then the resultant binary output is MR or MMR coded, then transmitted.

On the other hand, for color multivalued images typified by photos, the orthogonal transformation coding transmission technique is often used to compress image data. First, an input image is divided into blocks each of a predetermined size, then orthogonal transformation is performed for each block. Quantization processing is performed for the resultant orthogonal transformation output and the result is coded and compressed. However, the following problem is pointed out for the technique: If the technique is applied to text or a line drawing, degradation of mosquito noise, etc., is produced although the technique is effective for picture portions such as photos.

For example, the Unexamined Japanese Patent Application Publication No. Hei 4-354263 discloses a technique, assuming that a text or line drawing part is represented in binary form, for recognizing a binary part (text or line drawing part) and a multivalued part (picture or photo part) contained in an image and MMR coding the binary part and orthogonal transformation coding the multivalued part, then transmitting the result. The receiving party decodes and decompresses the coded and compressed data separately and recombines the decoded and decompressed data. The basic idea is similar to a technique for separating an image into a binary image plane of text and a multivalued image plane of picture or photo according to attribute and handling the planes; a compression technique fitted to text is used for the text image plane and a compression technique fitted to a picture or photo is used for the picture or photo image plane, whereby the compression rate is improved and image degradation is made inconspicuous.

However, with recent image data, text and line drawings have also been represented in multivalued form or color rather than in binary form increasingly. If an image with a mixture of text, a line drawing, and a picture represented in multivalued form or color is attempted to be transmitted using the conventional technique as described above, binary image coding, such as MMR, cannot be applied to text or line drawings, thus text and line drawings cannot be handled as binary parts. As one method to solve the problem, text and line drawings represented in multivalued form are binarized, whereby the conventional technique can be used. However, the quality of text and line drawings is degraded or discoloration occurs.

By the way, text and line drawings tend to become higher image quality as they are of higher resolution. Therefore, it is desirable to transmit or store text or a line drawing at high resolution as much as possible. However, if the resolution is raised haphazardly, the data amount increases and the transmission load also grows. Since text or a line drawing represented in multivalued form or color also has gradation information, the data amount grows more than that of binary data. If a large-capacity line carrying a load is used, no problem arises. However, if a small-capacity line such as a public line is used to transmit a multivalued or color image, it takes too long to transmit the image.

SUMMARY OF THE INVENTION

It is therefore an object of the invention to provide an image processing system and an image processing method capable of transmitting or storing image data in the optimum data amount with high image quality and an image transmitting system and an image transmitting method for transmitting image data in such a manner.

In the invention, input image information is converted into the multilayer data format consisting of a first piece of image data, a second piece of image data, and selection data for selecting either the first piece of image data or the second piece of image data. For example, a picture part such as a photo in the input image information can be made the first piece of image data, color information in a text or line drawing part can be made the second piece of image data, and form information in the text or line drawing part can be made the selection data. The selection data, which is used only for selecting either the first piece of image data or the second piece of image data can be handled as binary data and can be compressed at a high compression rate with image quality maintained at high resolution.

To reduce the transmitted or stored data amount, a method of converting high-resolution image data into low-resolution image data and furthermore compressing the data is possible in addition to changing of the compression method in response to the attribute as described above. Particularly, the second piece of image data need not be high resolution and can be converted into low resolution and compressed because the text or line drawing form information is separated.

Thus, in the invention, the input image information is separated into the first piece of image data, the second piece of image data, and the selection data and resolution conversion processing and data compression can be executed in response to the first piece of image data, the second piece of image data, and the selection data, whereby high-quality image data can be transmitted or stored in a small data amount.

To thus execute resolution conversion, it is necessary to balance the data amount and image quality. If it is not considered, transmission time is taken too much or the storage area is occupied unnecessarily because the transmission data amount is too large. In contrast, the transmission time is short and no storage area is required, but satisfactory image quality is not provided in some cases. Thus, in the invention, the resolutions of the first piece of image data, the second piece of image data, and the selection data are preset properly in response to the image characteristics, system characteristics, system limitation, transmission amount limitation, etc., whereby the image data can be transmitted or stored with the optimum image quality in the appropriate data amount.

Setup-resolution image data is provided by scanning an original image through the input means in accordance with the setup resolution of the selection data, for example, when image information is input, or can also be provided by performing resolution conversion processing. For example, resolution can be set in response to user's specification of the image quality or the image type. For example, if high picture quality is specified or the image type is specified as text, the selection data having text form information is set to high resolution, whereby text or a line drawing can be transmitted or stored with high image quality. If the user specifies the image type as picture such as photo, the first piece of image data having picture information is set to high resolution, whereby a picture can be transmitted or stored with high image quality.

Resolution can also be set considering the reception capability of a receiving system for receiving image information in the multilayer data format. For example, resolution can be determined based on the highest resolution at which the receiving system can receive image information; waste of the transmission time by transmitting image information at high resolution that cannot be handled at the receiving party can be avoided. The resolution of the selection data can be set to 1/ns the highest resolution at which the receiving system can receive image information where ns is a natural number, and the resolutions of the first piece of image data and the second piece of image data can be set to 1/n1 and 1/n2 the resolution of the selection data where n1 and n2 are each a natural number, whereby resolution conversion processing can be simplified and reconstructing the image in the receiving system is facilitated.

Further, resolution can also be set in response to the data amount. For example, if the compressed data amounts of the first piece of image data and the second piece of image data compressed are greater than predetermined amounts or the sum of the compressed data amounts is greater than a predetermined amount, the data is converted into lower resolution, the data amount is reduced, and the data can be again compressed, whereby the image information can be transmitted or stored in any desired data amount range.

BRIEF DESCRIPTION OF THE DRAWINGS

In the accompanying drawings:

FIG. 8 is a flowchart to show an operation example in the second embodiment of the image processing system of the invention;

DETAILED DESCRIPTION OF THE PREFERRED EMBODIMENTS (First Embodiment)

Figure 1:
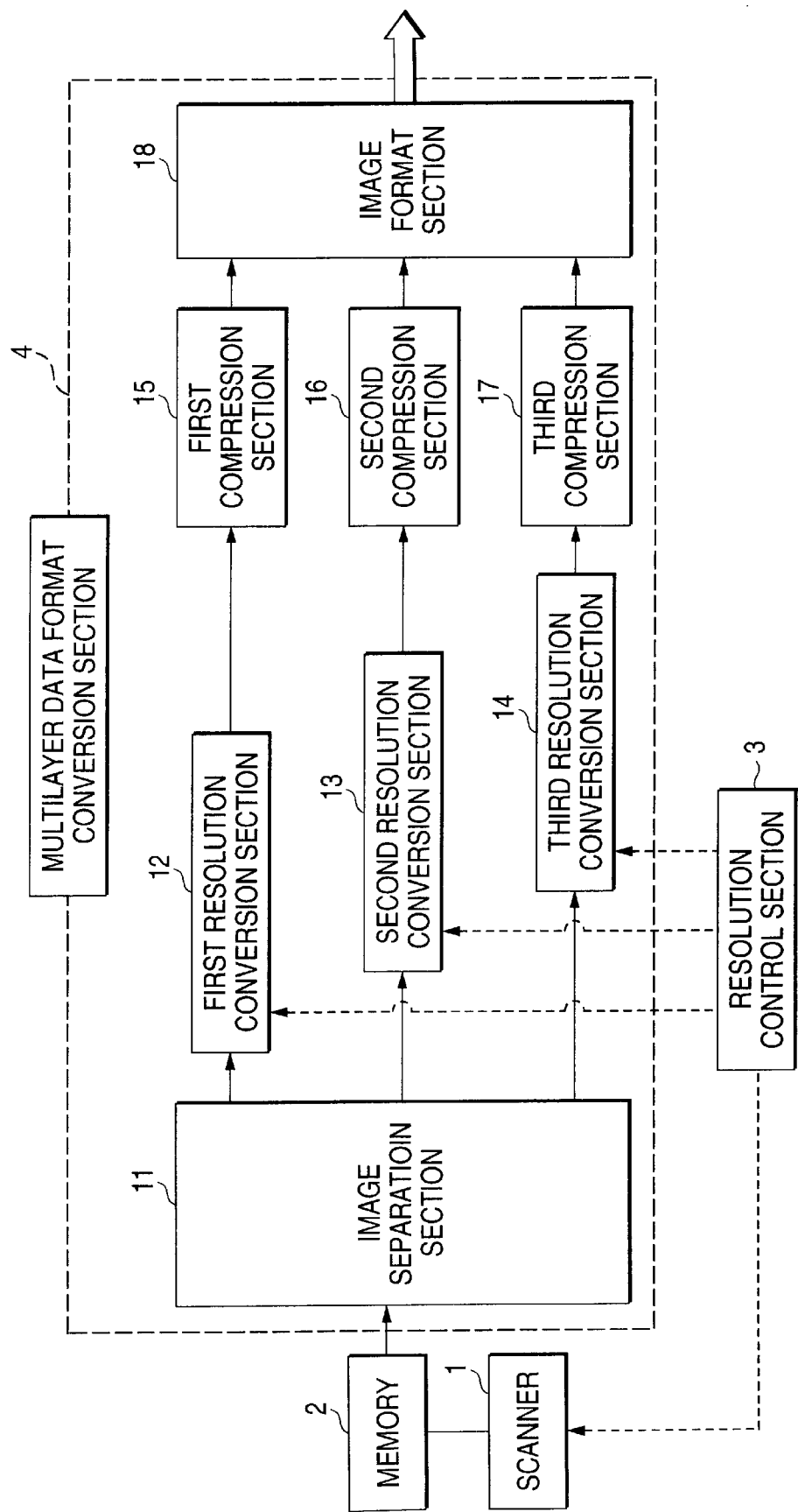
FIG. 1 is a block diagram to show a first embodiment of an image processing system of the invention.

FIG. 1 is a block diagram to show a first embodiment of an image processing system of the invention. In the figure, numeral 1 is a scanner, numeral 2 is memory, numeral 3 is a resolution control section, numeral 4 is a multilayer data format conversion section, numeral 11 is an image separation section, numeral 12 is a first resolution conversion section, numeral 13 is a second resolution conversion section, numeral 14 is a third resolution conversion section, numeral 15 is a first compression section, numeral 16 is a second compression section, numeral 17 is a third compression section, and numeral 18 is an image format section.

The scanner 1 scans an original image in resolution set by the resolution control section 3 and inputs image information. It is an example of a device for inputting image information and may be any other image input unit for which resolution can be set, such as an external computer for transferring image information in setup resolution. The memory 2 stores the image information input through the scanner 1. The image processing system can also be configured without the memory 2. The resolution control section 3, which previously retains resolution information corresponding to the first piece of image data, second piece of image data, and selection data, sets resolution applied when the scanner 1 scans an original image for the scanner 1 and also sets conversion resolution for the first resolution conversion section 12, the second resolution conversion section 13, and the third resolution conversion section 14 of the multilayer data format conversion section 4.

The multilayer data format conversion section 4 converts input image information into a multilayer data format consisting of a first piece of image data, a second piece of image data, and selection data for selecting either the first piece of image data or the second piece of image data and outputs the conversion result. It has the image separation section 11, the first resolution conversion section 12, the second resolution conversion section 13, the third resolution conversion section 14, the first compression section 15, the second compression section 16, the third compression section 17, the image format section 18, etc.

The image separation section 11 separates the image data input to the memory 2 into three image planes of a first piece of image data, a second piece of image data, and selection data. The first resolution conversion section 12, the second resolution conversion section 13, and the third resolution conversion section 14 converts the image planes provided by the image separation section 11 into the resolutions specified by the resolution control section 3. At this time, if the resolution specified by the resolution control section 3 matches that of the image plane, resolution conversion need not be executed. Any techniques may be adopted for resolution conversion executed in the first resolution conversion section 12, the second resolution conversion section 13, and the third resolution conversion section 14; optimum conversion techniques for the image planes can be used. The first compression section 15, the second compression section 16, and the third compression section 17 compress the image planes output from the first resolution conversion section 12, the second resolution conversion section 13, and the third resolution conversion section 14 respectively. Any compressing techniques may be adopted for the image planes; optimum compressing techniques for the image planes can be used to compress the image planes. The image format section 18 wraps the three image planes compressed in the first compression section 15, the second compression section 16, and the third compression section 17 in one data format.

Figure 2:
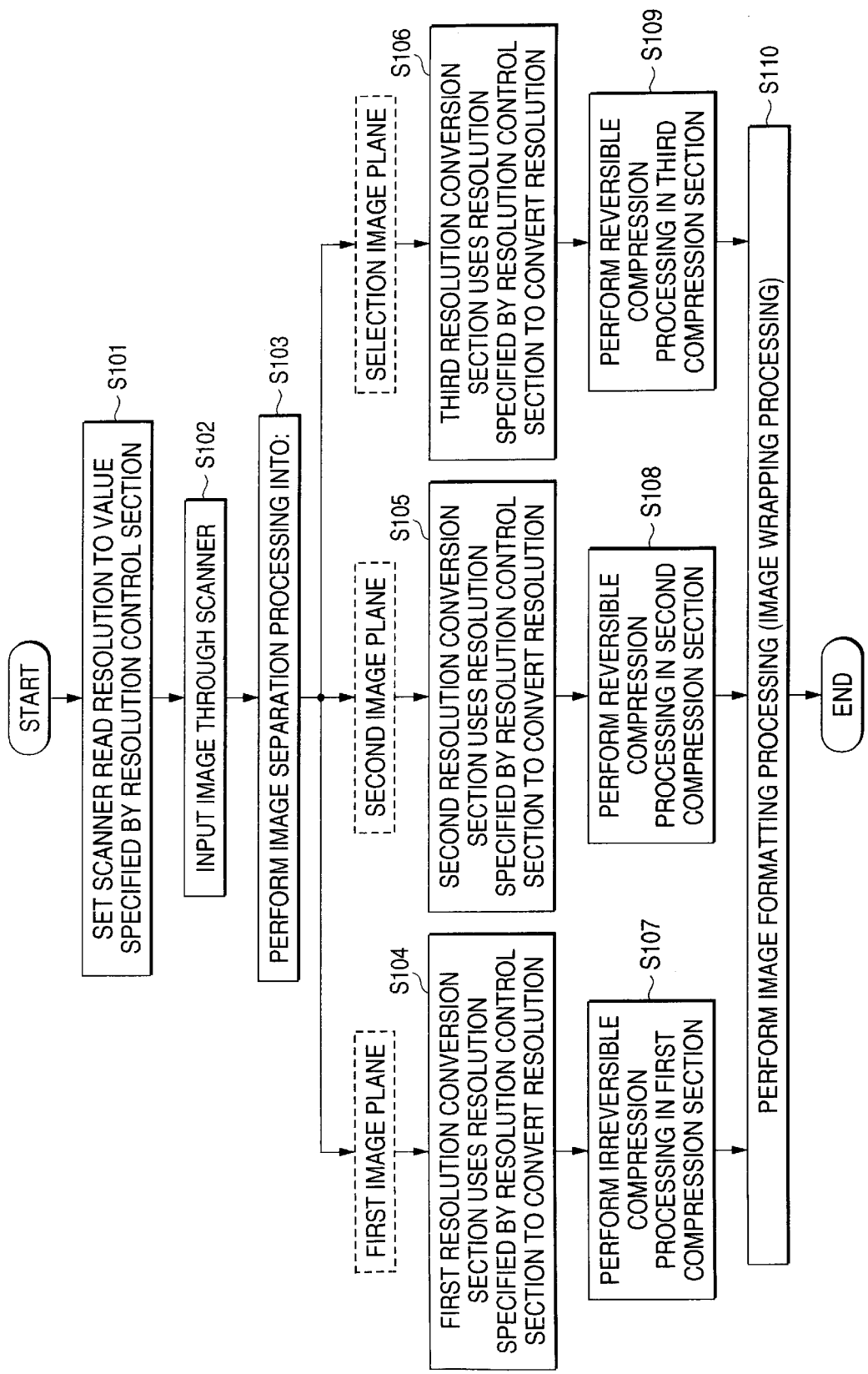
FIG. 2 is a flowchart to show an operation example in the first embodiment of the image processing system of the invention.

FIG. 2 is a flowchart to show an operation example in the first embodiment of the image processing system of the invention. First, at step S101, the resolution control section 3 sets read resolution of the scanner 1. At step S102, the scanner 1 scans an original image at the setup read resolution, reads image information, and stores the image information in the memory 2.

Next, at step S103, the image separation section 11 of the multilayer data format conversion section 4 reads the image information stored in the memory 2 and separates the image information into three image planes of a first image plane of a first piece of image data (picture part), a second image plane of a second piece of image data (text part color information), and a selection image plane of selection data.

The first piece of image plane provided is input to the first resolution conversion section 12 and at step S104, undergoes resolution conversion processing to the resolution set by the resolution control section 3. Likewise, the second piece of image plane provided is input to the second resolution conversion section 13 and at step S105, undergoes resolution conversion processing to the resolution set by the resolution control section 3. The selection image plane provided is input to the third resolution conversion section 14 and at step S106, undergoes resolution conversion processing to the resolution set by the resolution control section 3. Of course, in fact, resolution conversion may be skipped for some or all of the planes.

The first piece of image plane after undergoing the resolution conversion is input to the first compression section 15, the second image plane after undergoing the resolution conversion is input to the second compression section 16, and the selection image plane after undergoing the resolution conversion is input to the third compression section 17. Predetermined compression processing is performed for the planes separately at steps S107, S108, and S109.

The three image planes compressed in the first compression section 15, the second compression section 16, and the third compression section 17 are input to the image format section 18. At step S110, the image format section 18 wraps the three compressed image planes in one data format.

The operation example will be discussed in more detail with specific examples. First, at step S101, the resolution control section 3 sets read resolution of the scanner 1 and at step S102, an image is read in the setup resolution. As an example, if the resolution set by the resolution control section 3 is 400 dpi, the scanner 1 scans and reads an original image at the resolution 400 dpi. At this time, the resolution control section 3 can consider the capability of the scanner 1 and sets resolution within the range. One or more sets of resolutions of the first piece of image data, the second piece of image data, and selection data are preset in the resolution control section 3; for example, a standard resolution set can be selected. The read resolution of the scanner 1 can be set in response to the selection data resolution in the set, for example. The image input through the scanner 1 is stored in the memory 2.

FIG. 3 is an illustration of a specific example of image separation in the first embodiment of the image processing system of the invention. For example, assume that the image information input through the scanner 1 is a color image with a picture and text mixed as shown in FIG. 3A. In the image shown in FIG. 3A, character string JAPAN and a halftone Japanese map are drawn. The character string JAPAN is also drawn in different colors for each character. For convenience of illustration, different hatchings are used to show different colors.

Figure 3A:
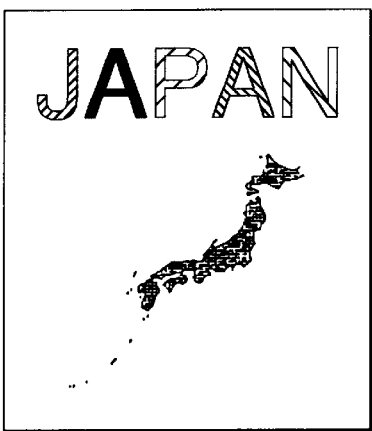
FIGS. 3A–3D are illustrations of a specific example of image separation in the first embodiment of the image processing system of the invention.
Figure 3B:
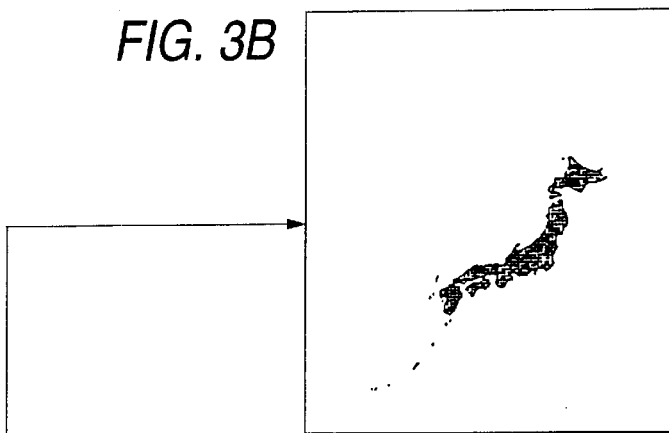
Figure 3C:
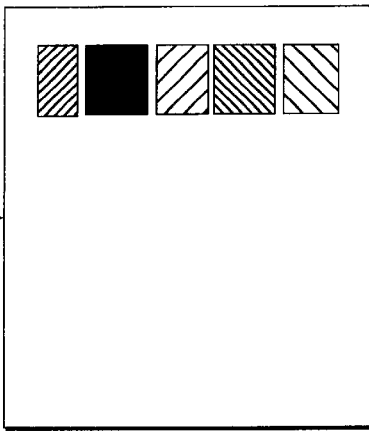
Figure 3D:
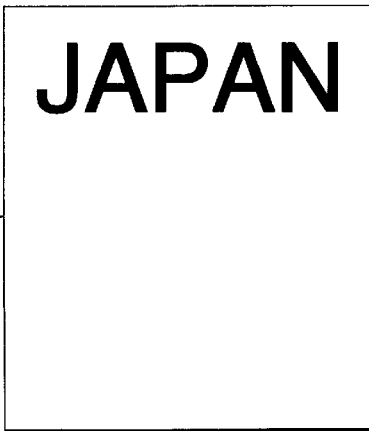
Figure 4A:
FIGS. 4A–4D are schematic representations of another specific example of image separation in the first embodiment of the image processing system of the invention.
Figure 4B:
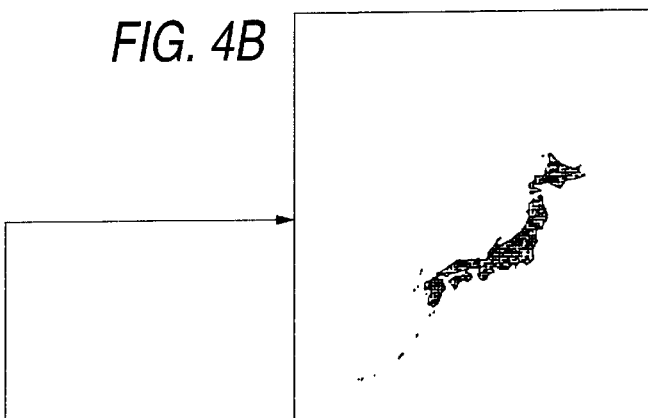
Figure 4C:
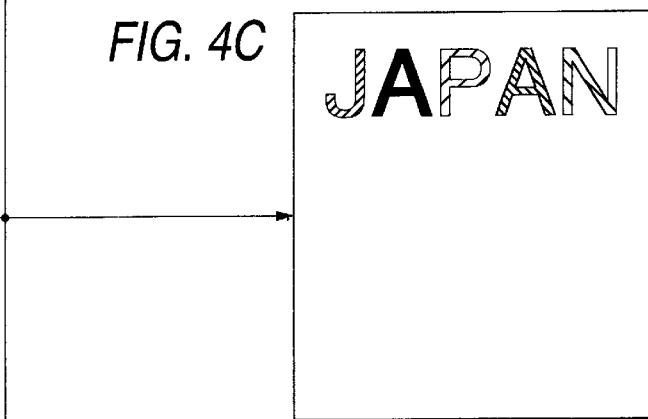
Figure 4D:
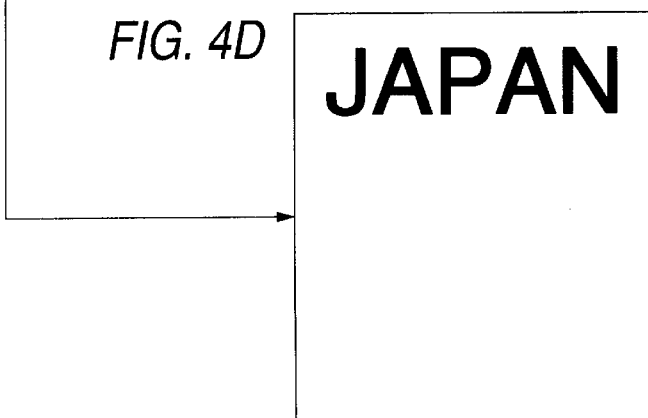

The image separation section 11 separates an image, as shown in FIG. 3A, stored in the memory 2 into three image planes as shown in FIGS. 3B–3D at step S103. Here, a picture portion such as a photo is separated as a first piece of image data and a first image plane is generated. That is, as shown in FIG. 3B, the halftone Japanese map portion is separated as the first image plane. Color information of a text line drawing portion is separated as the second piece of image data and a second image plane is generated. That is, as shown in FIG. 3C, only the color information of the character string JAPAN is separated as the second image plane. A selection image plane is generated with selection data for selecting either the first piece of image data or the second piece of image data; such data to select the second image plane for pixels making up text or a line drawing may be held. At this time, a set of the pixels making up text or a line drawing is information indicating the text or line drawing form. Thus, as shown in FIG. 3D, the form information of the character string JAPAN is separated as the selection image plane.

Here, the first image plane shown in FIG. 3B requires data length for holding color and gradation to represent a color multivalued image such as a photo or a picture. The second image plane shown in FIG. 3C needs to be color multivalued image data for representing character color for each pixel, but need not hold character forms, thus may be a color pallet for each character if the characters are uniform color characters, for example. Thus, in the example shown in FIG. 3C, circumscribed rectangles are used and are shown as uniform color areas in the character occurring areas. Further, the selection image plane shown in FIG. 3D holds the text or line drawing form as described above, thus preferably the resolution of the plane is higher. However, the selection image plane, which is used only for selecting either the first piece of image data or the second piece of image data, here may be 1-bit information per pixel and can be handled as binary data.

To again combine the three image planes into the original image, for the portion representing the text line drawing form (black portion) in FIG. 3D, the second piece of image data (character color pallet) in FIG. 3C is output and for other portions (white portions), the first piece of image data (picture part) in FIG. 3B is output, whereby the original image can be reconstructed.

FIG. 4 is an illustration of another specific example of image separation in the first embodiment of the image processing system of the invention. An image can also be separated, for example, as shown in FIG. 4 as well as FIG. 3. FIG. 4A is the same input image as FIG. 3A. FIG. 4B, like FIG. 3B, is separation of a color multivalued picture portion such as a photo. FIG. 4D, like FIG. 3D, is a selection image plane (text line drawing shape is reflected). FIG. 4C, unlike FIG. 3C, provides an image plane having both text line drawing shape and its color information. In this case, intuitively, three image planes of a first image plane as an image component of a comparatively low-frequency component such as a picture, a second image plane as an image component of a comparatively high-frequency component such as a text line drawing (containing color), and a selection image plane for combining the first and the second image planes into one image plane are provided.

In addition, based on the idea, any other image separation mode may be used, needless to say. Here, an image is separated into three planes, but may be separated into four planes containing a CG (computer graphics) image portion, for example,; the number of planes is not limited to three. The description to follow assumes that an image is separated into three planes in the mode as shown in FIG. 3.

Various methods for separating an input image are proposed. For example, the Unexamined Japanese Patent Application Publication No. Hei 2-267678 discloses a technique for extracting the circumscribed rectangle and contours for each image part (picture, text) and determining whether the part is a picture or text line drawing based on the density feature in the extracted circumscribed rectangle, the area of the circumscribed rectangle, etc. Three image planes are generated based on the provided separation result. In addition, for example, a method using the density difference as described in the Unexamined Japanese Patent Application Publication No. Hei 5-14701, a technique extracting a feature amount for each small area and integrating the feature amounts as described in the Unexamined Japanese Patent Application Publication No. Hei 5-114045, and the like are also available. Any of the techniques or any other known technique can be used as the image separation method used in the invention.

Next, resolution conversion is executed for each of the image planes into which the image is separated at steps S104–S106. As described above, for example, the standard resolutions for the image planes are set in the resolution control section 3. The resolutions of the image planes are converted based on the setup resolutions. For example, for three image planes into which an image read at 400 dpi is separated as shown in FIG. 3, the first image plane (picture part) is converted into 100 dpi, the second image plane is converted into 100 dpi, and the selection image plane is converted into 200 dpi as conversion into lower resolutions.

For the resolutions set in the resolution control section 3 (resolutions to convert into), the standard resolutions are previously determined by the capacity limitation, etc., of the storage unit if image data is stored and the capacity limitation, etc., of the transmission line if image data is transmitted, for example. The resolution values thus determined are stored in the resolution control section 3. As the resolution relationships among the image planes, considering text and line drawings requiring high resolution, it is advisable to set the standard resolution of the selection image plane affecting the image quality at the combining time higher than the standard resolutions of other two image planes.

A known technique may be used for the resolution conversion method. A projection method capable of well maintaining gradation may be used for the first image plane (picture) and a zero-order hold method, a nearest-field method, etc., with less color change and noise may be used for the second image plane (character color) and the selection image plane.

The read resolution of the scanner 1 can be previously matched with the standard resolution of the selection image plane (character contours). For example, if the resolution of the selection image plane is 200 dpi, 200 dip may be set as the read resolution of the scanner 1, whereby the selection image plane resulting from separating the image can be input directly to the third compression section 17 and the third resolution conversion section 14 can be made unnecessary, reducing the system scale. If other two image planes are of low resolution, generally image quality degradation is inconspicuous at the combining time, thus the image planes may be converted into lower resolution than the read resolution of the scanner 1. However, this is not necessarily applied if higher image quality is required or load is not much imposed on transmission; for example, the two image planes can also be transmitted in the same resolution as the selection image plane.

Resolution conversion processing responsive to the three image planes is thus performed, whereby the data amount can be drastically decreased by performing compression processing described later in combination.

Next, at steps S107–S109, predetermined compression processing is performed separately for the image planes after undergoing the resolution conversion. A known irreversible compression method may be used to code the first image plane, which contains a picture such as a photo. For example, orthogonal transformation coding can be used. Since the second image plane contains color information of text or line drawing, it is desirable to suppress discoloration as much as possible. Thus, a known reversible compression method may be used; for example, an LZ method, etc., can be used. Since the third image plane contains text or line drawing forms, an existing reversible coding method of binary images not degrading the forms may be used. For example, an MMR method, MR method, MH method, etc., can be used. The compression processing will not be discussed in detail here.

Last, the image format section 18 wraps the three compressed image planes provided in one data format. For example, the three data pieces are concatenated sequentially and information indicating what coding methods are used to compress the data, resolution values, and the like are added as the data format. Any other known format, such as TIFF, may be used. The data format will not be discussed in detail.

Thus, according to the first embodiment, the standard resolutions of the image planes are preset in response to the memory limitation, the capability, etc., of the system, so that the maximum performance of the system is maintained and a high-quality image can be provided without wasting the transmission time or storage capacity. Resultantly, color image processing keeping with the communication and system environments is enabled as compared with the conventional processing. When image information is input, it is read at the resolution of the selection image plane, for example, whereby the system configuration can be simplified.

In the description made so far, color text and a picture are mixed in an image, but the invention can also be applied if the image contains only color text or only a picture. For example, if the image contains only color text, the first image plane (picture) may be handled as blank image data or the image format section 18 can add the fact that the first image plane does not exist (is not added to the transmission format) as information. If the image contains only a picture, the second image plane and the selection image plane may be handled as blank image data or the image format section 18 can add the fact that the second image plane and the selection image plane do not exist (are not added to the transmission format) as information.

(Second Embodiment)

Figure 5:
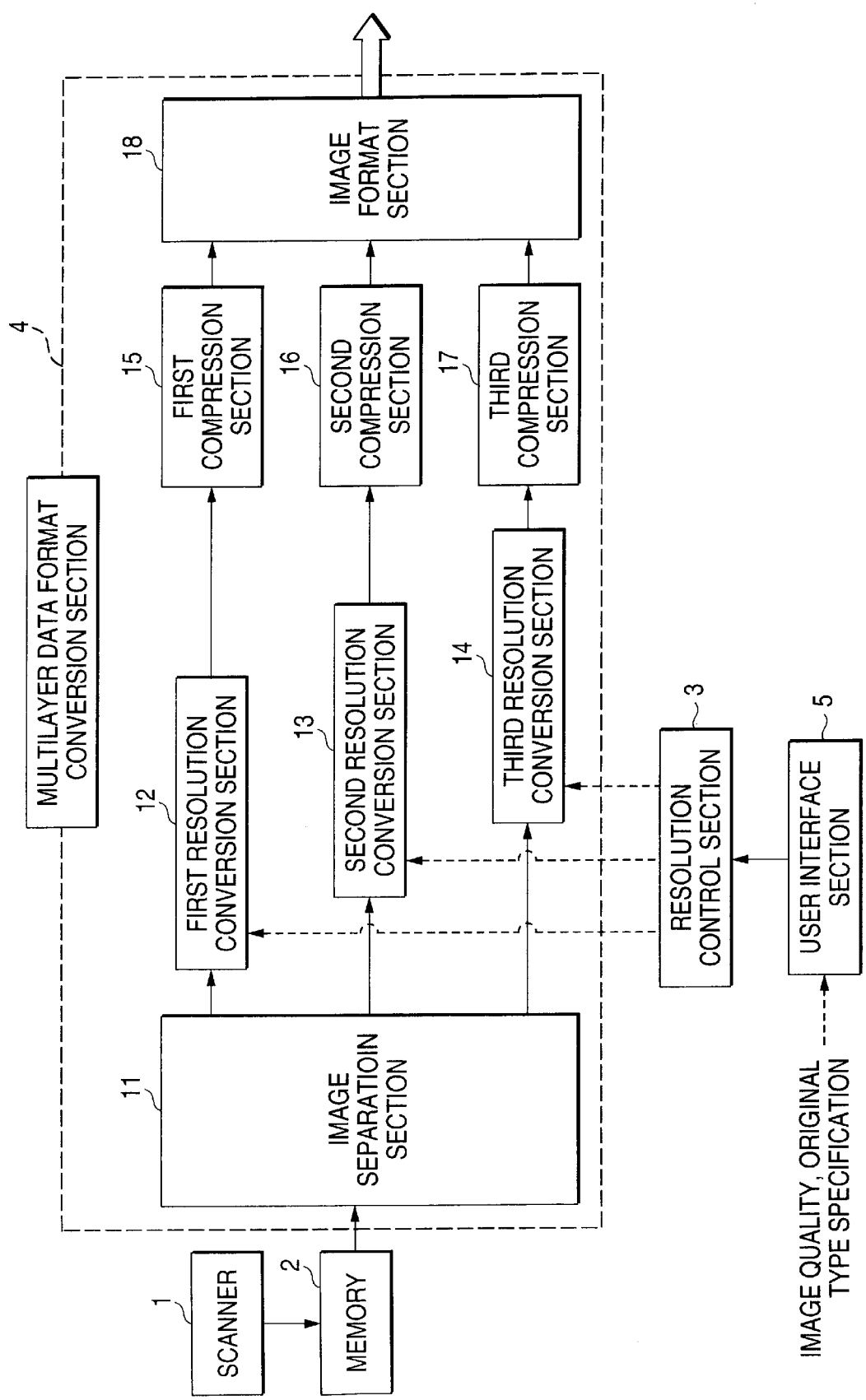
FIG. 5 is a block diagram to show a second embodiment of an image processing system of the invention.

FIG. 5 is a block diagram to show a second embodiment of an image processing system of the invention. Parts identical with or similar to those previously described with reference to FIG. 1 are denoted by the same reference numerals in FIG. 5 and will not be discussed again. In FIG. 5, numeral 5 is a user interface section. The second embodiment provides a system configuration for setting resolutions in response to a user's image quality request or original type.

The user interface section 5 accepts image quality mode or original type specification from the user. A resolution control section 3 interprets the image mode or original type accepted at the interface section 5 and sets predetermined resolutions to convert into for a first resolution conversion section 12, a second resolution conversion section 13, and a third resolution conversion section 14. At this time, the resolutions of three image planes are changed in response to the user-specified image quality request or original type. If a scanner 1 is connected as input means as in the first embodiment, the resolution control section 3 may set read resolution for the scanner 1. In the second embodiment, not only the scanner 1, but also various image input units may be connected or a different computer or machine may be connected directly or via a network to the image processing system for inputting image information therefrom.

FIG. 6 is a schematic representation of a display screen example for specifying an image quality mode on the user interface section in the second embodiment of the invention. FIG. 7 is a schematic representation of a display screen example for specifying an original type on the user interface section in the second embodiment of the invention. Here, as an example, options are displayed on a screen and the user specifies one of the options through input means such as a touch panel or a pointing device. Of course, various specification methods such as pressing of a button (key), etc., may be used. In the example, the standard mode is preset as default and the setup mode is reverse-displayed. Here, for convenience of illustration, the reverse-displayed portion is hatched.

Figure 6A:
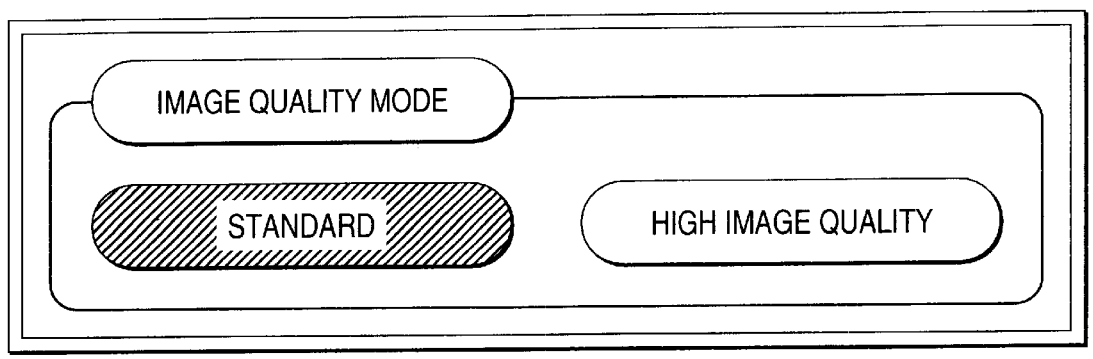
FIGS. 6A–6B are schematic representations of a display screen example for specifying an image quality mode on a user interface section in the second embodiment of the invention.
Figure 6B:
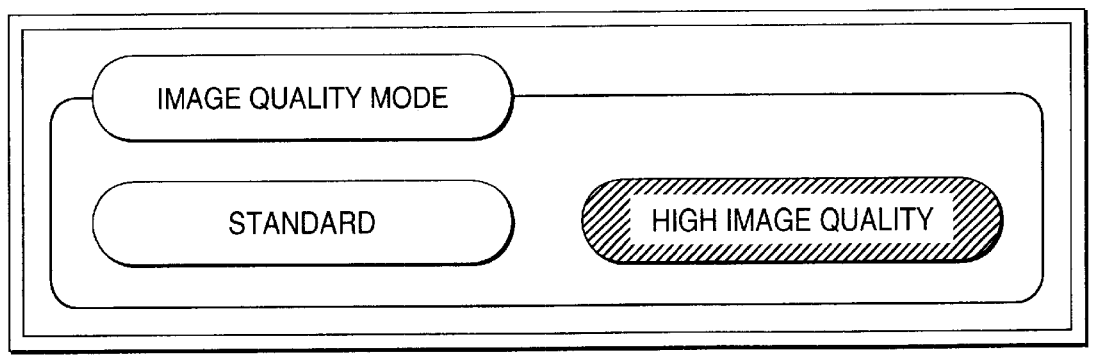

In the example shown in FIG. 6, either "standard" or "high image quality" can be selected as the image quality mode. As shown in FIG. 6A, "standard" is set as default. To select high image quality, the user can touch display of "high image quality" for changing the mode to high image quality. At this time, as shown in FIG. 6B, the character string "high image quality" is reverse-displayed, informing the user that the high image quality mode is selected. Of course, then the user can also touch display of "standard" for restoring the mode to standard.

Figure 7A:
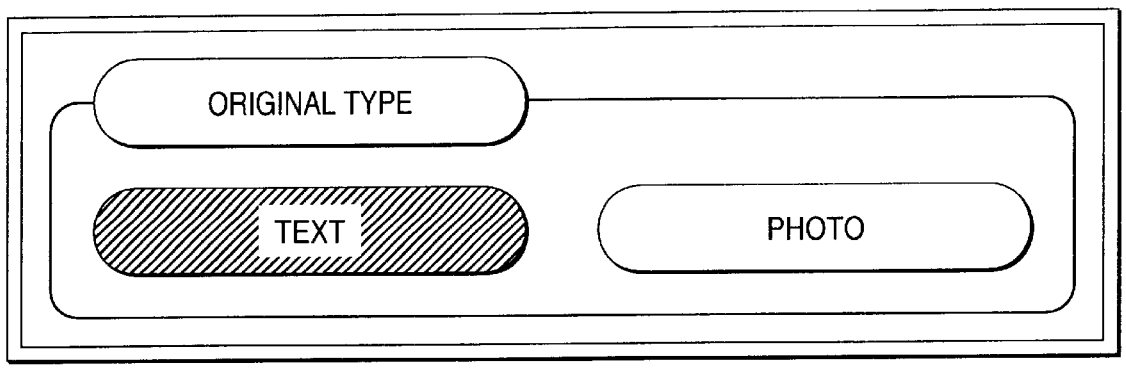
FIGS. 7A–7B are schematic representations of a display screen example for specifying an original type on the user interface section in the second embodiment of the invention.
Figure 7B:
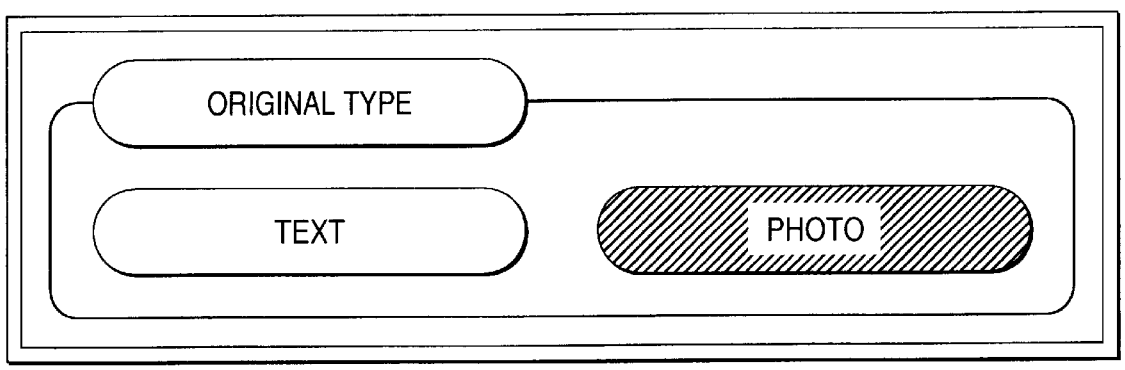

In the example shown in FIG. 7, either "text" or "photo" can be selected as the original type. As shown in FIG. 7A, "text" is set as default. Like specification of the image quality mode, the user can use the touch panel to change the mode. For example, if the user touches display of "photo," "photo" is selected as the original type and the display changes as shown in FIG. 7B.

The option names of the image quality mode and the original type are not limited to those displayed above and may be changed appropriately. Other options such as "ultra high image quality" and "text and photo mixed" may be provided. Further, the default image quality mode and original type are not limited to those displayed above and any other image quality mode or original type may be set as default. Such default setting may be eliminated so that the user sets default values.

FIG. 8 is a flowchart to show an operation example in the second embodiment of the image processing system of the invention. First, at step S121, the user specifies the image quality mode or the original type through the user interface section 5. At step S122, the resolution control section 3 sets conversion resolutions (resolutions to convert into) in the first resolution conversion section 12, the second resolution conversion section 13, and the third resolution conversion section 14. The processing at step S122 will be discussed in detail with reference to flowcharts shown in FIG. 9 and FIG. 10. The description to follow assumes that only either the image quality mode or the original type can be specified.

Figure 9:
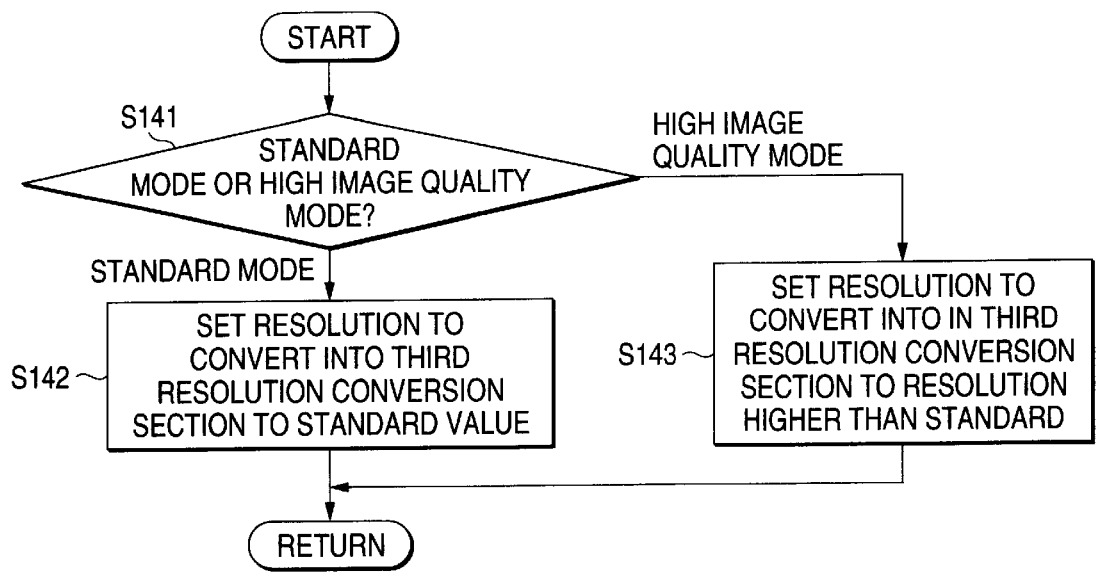
FIG. 9 is a flowchart to show an example of resolution setting processing according to the image quality mode in the second embodiment of the image processing system of the invention.

FIG. 9 is a flowchart to show an example of resolution setting processing according to the image quality mode in the second embodiment of the image processing system of the invention. To select the image quality mode on the screen as shown in FIG. 6, the user selects either "standard" or "high image quality" as the image quality mode. At step S141, which image quality mode the user selects is determined. If "standard" is selected, control goes to step S142 at which the resolution to convert into in the third resolution conversion section 14 is set to the standard resolution. If "high image quality" is selected. as the image quality mode, control goes to step S143 at which the resolution to convert into in the third resolution conversion section 14 is set to a resolution higher than the standard resolution.

The third resolution conversion section 14 executes resolution conversion of a selection image plane containing text or line drawing forms, as described in the first embodiment.

Generally, text and line drawings are most affected by the output resolution. Thus, if the image quality mode is set to "high image quality," the selection image plane resolution affecting the image quality of text and line drawings at the combining time is converted into a higher resolution than the standard resolution for improving the image quality of text and line drawings.

For example, if the resolution of input image information is 300 dpi and "standard" is selected, the resolution to convert into in the third resolution conversion section 14 may be set to standard value 200 dpi; if "high image quality" is selected, the resolution to convert into may be set to 400 dpi, and so forth. Resolution conversion need not be executed in some cases depending on the input resolution of the scanner 1. For example, if the resolution of image information input through the scanner 1 is equal to the standard resolution and the image quality mode is "standard," processing in the third resolution conversion section 14 is not performed, or if the resolution of image information input through the scanner 1 is higher than the standard value and the image quality mode is "high image quality," the read resolution may be used as the selection image plane resolution intact or resolution may be raised. In addition, various resolutions to convert into are possible depending on the values of the read resolution of the scanner 1 and the standard resolution; basically, if "high image quality" is specified, resolution is set so as to improve the image quality of text and line drawings by making the preset selection image plane resolution higher than the standard resolution.

Further, if "high image quality" is specified for the resolutions of other two image planes as well as the selection image plane resolution, a higher resolution than the standard resolution of each image plane may be set.

Figure 10:
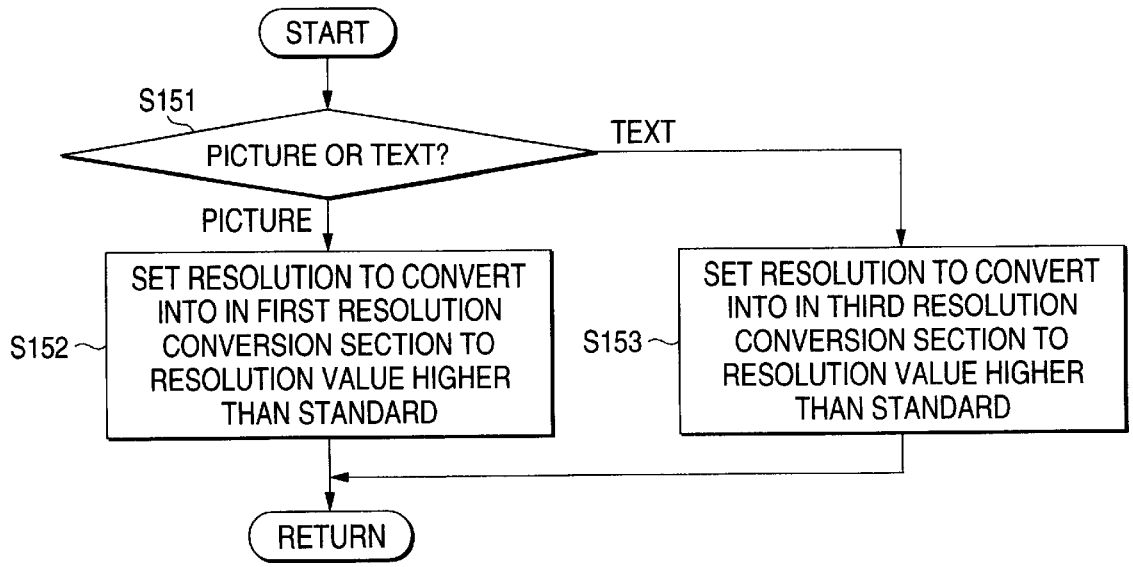
FIG. 10 is a flowchart to show an example of resolution setting processing according to the original type in the second embodiment of the image processing system of the invention.

FIG. 10 is a flowchart to show an example of resolution setting processing according to the original type in the second embodiment of the image processing system of the invention. To select the original type on the screen as shown in FIG. 7, the user selects either "text" or "photo" as the original type. At step S151, which original type the user selects is determined. If "picture" is selected as the original type, control goes to step S152 at which the resolution to convert into in the first resolution conversion section 12 is set to a higher resolution than the standard resolution. If "text" is selected, control goes to step S153 at which the resolution to convert into in the third resolution conversion section 14 is set to a higher resolution than the standard resolution.

For example, when the standard resolution of the first image plane (containing a picture) is 100 dpi and that of the selection image plane (containing text or line drawing forms) is 100 dpi, if the user specifies "picture," the resolution of the first image plane is raised to 200 dpi higher than the standard resolution; if the user specifies "text," the resolution of the selection image plane is raised to 200 dpi higher than the standard resolution. Basically, the processing is similar to that for specifying the image quality mode and the user may be able to specify the resolution for each image attribute.

Referring again to the flowchart of FIG. 8, step S123 and the later are executed. The subsequent processing is similar to the processing at step S102 and the later in FIG. 2 in the first embodiment and therefore will be discussed briefly. At step S123, an image is input through the scanner 1 and input image information is stored in memory 2. At step S124, an image separation section 11 separates the image information stored in the memory 2 into three image planes, for example, as shown in FIG. 3 or FIG. 4. At steps S125–S127, the first resolution conversion section 12, the second resolution conversion section 13, and the third resolution conversion section 14 convert the three image planes provided into the resolutions set by the resolution control section 3. Further, at step S128–S130, a first compression section 15, a second compression section 16, and a third compression section 17 compress the image planes undergoing the resolution conversion. Last, at step S131, an image format section 18 wraps the three compressed image planes in a predetermined data format and outputs the result.

Thus, according to the second embodiment, the resolutions of the image planes can be set in response to the user-requested image quality mode or original type, so that the image quality of text and a picture can be improved appropriately, whereby an original can be transmitted or stored in the resolution responsive to the purpose of the user.

In the description, only either the image quality mode or the original type is specified, but specification of both the image quality mode and the original type may be enabled. In this case, priority may be assigned to the image quality mode and the original type as acriterion for determining the resolution. Alternatively, the resolution to convert into may be set in response to combination of the image quality mode and the original type. For example, if "standard" and "picture" are specified, the resolution to convert into in the first resolution conversion section 12 can be set to 100 dpi; if "high image quality" and "picture" are specified, the resolution can be set to 200 dpi. If "standard" and "text" are specified, the resolution to convert into in the third resolution conversion section 14 can be set to 100 dpi; if "high image quality" and "text" are specified, the resolution can be set to 300 dpi.

(Third Embodiment)

Figure 11:
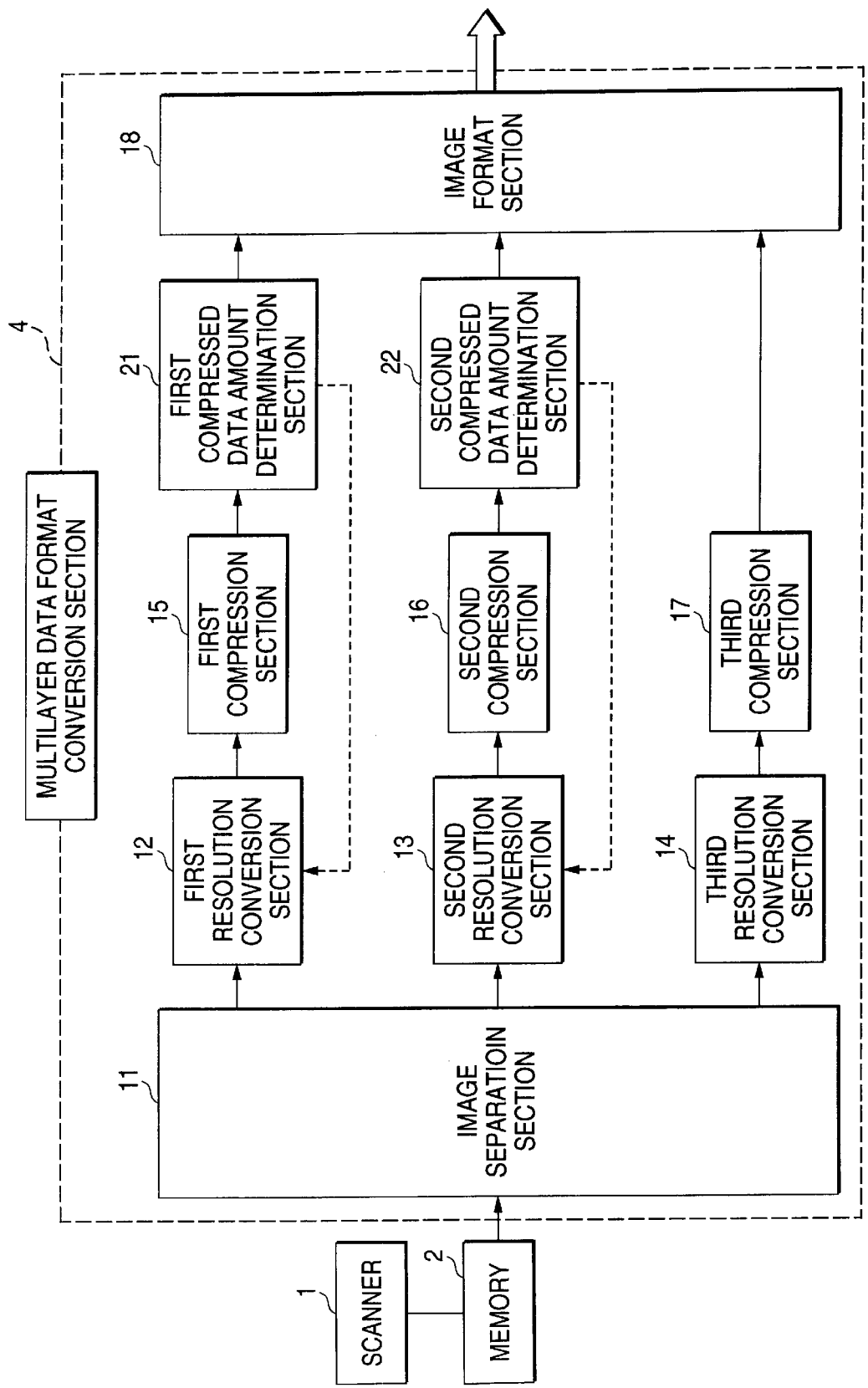
FIG. 11 is a block diagram to show a third embodiment of an image processing system of the invention.

FIG. 11 is a block diagram to show a third embodiment of an image processing system of the invention. Parts identical with or similar to those previously described with reference to FIG. 1 are denoted by the same reference numerals in FIG. 11 and will not be discussed again. In FIG. 11, numeral 21 is a first compressed data amount determination section and numeral 22 is a second compressed data amount determination section. The third embodiment provides a system configuration for automatically setting resolutions according to the compressed data amount.

The first compressed data amount determination section 21 measures the data amount of a first image plane compressed by a first compression section 15, compares the data amount with a preset threshold value, and determines whether or not the compressed data amount is equal to or less than the threshold value. If the compressed data amount is equal to or less than the threshold value, the first compressed data amount determination section 21 outputs the first image plane compressed to an image format section 18. If the compressed data amount exceeds the threshold value, the first compressed data amount determination section 21 does not output the first image plane compressed and instructs a first resolution conversion section 12 to convert the first image plane into a lower resolution. Likewise, the second compressed data amount determination section 22 measures the data amount of a second image plane compressed by a second compression section 16, compares the data amount with a preset threshold value, and determines whether or not the compressed data amount is equal to or less than the threshold value. If the compressed data amount is equal to or less than the threshold value, the second compressed data amount determination section 22 outputs the second image plane compressed to the image format section 18. If the compressed data amount exceeds the threshold value, the second compressed data amount determination section 22 does not output the second image plane compressed and instructs a second resolution conversion section 13 to convert the second image plane into a lower resolution.

The first resolution conversion section 12 and the second resolution conversion section 13 temporarily retains the first and second image planes respectively and perform resolution conversion processing according to instructions from the first compressed data amount determination section 21 and the second compressed data amount determination section 22. Resolution conversion need not necessarily be performed just after image information is separated by an image separation section 11. If resolution conversion is not performed, to hold the resolution of a selection image plane higher than the resolutions of the first and second image planes, the resolution of input image information may be adopted for the resolution of the selection image plane without providing a third resolution conversion section 14.

Figure 12:
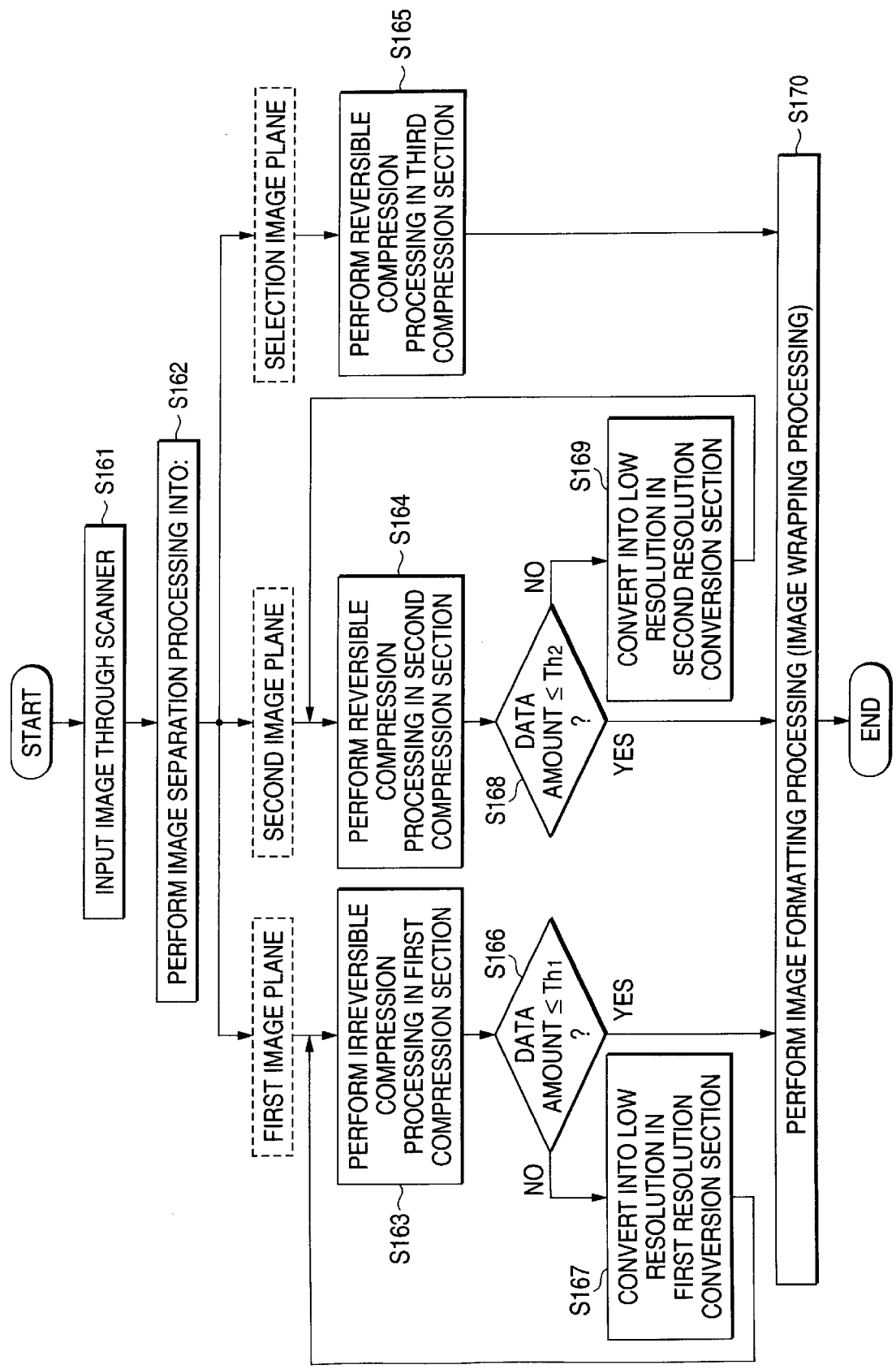
FIG. 12 is a flowchart to show an operation example in the third embodiment of the image processing system of the invention.

FIG. 12 is a flowchart to show an operation example in the third embodiment of the image processing system of the invention. First, at step S161, image information is input through a scanner 1. Of course, image information may be input via any other input machine or network as in the second embodiment. The input image information is once stored in the memory 2. At step S162, the image data stored in the memory 2 is separated into three image planes of a first image plane, a second image plane, and a third image plane by the image separation section 11, for example, as in the first embodiment.

The three image planes provided are input to the first resolution conversion section 12, the second resolution conversion section 13, and the third resolution conversion section 14. To maintain the image quality as much as possible, resolution conversion is not executed just after the separation and the resolution of the input image information is adopted intact. Of course, just after the separation, conversion to the standard resolution or the user-specified resolution may be executed as in the first and second embodiments.

Subsequently, compression processing is performed separately for the three image planes. At step S163, the first image plane (containing a picture) undergoes irreversible compression processing in the first compression section 15. At step S164, the second image plane (containing text or line drawing color information) undergoes reversible compression processing in the second compression section 16. At step S165, the selection image plane (containing text or line drawing forms) undergoes reversible compression processing in a third compression section 17. The compression processing may be performed for the image planes in a similar manner to that in the first or second embodiment.

First, the first image plane compressed in the first compression section 15 is input to the first compressed data amount. determination section 21, which at step S166 determines whether or not the compressed data amount of the first image plane is equal to or less than preset threshold value Th1. If the compressed data amount is equal to or less than the threshold value Th1 as a result of the determination, the first compressed data amount determination section 21 outputs the first image plane compressed to the image format section 18. If the compressed data amount exceeds the threshold value Th1, the first compressed data amount determination section 21 does not output the first image plane compressed and instructs the first resolution conversion section 12 to lower the first image plane resolution in resolution conversion processing. Upon reception of the instruction, at step S167 the first resolution conversion section 12 converts the first image plane into a lower resolution than the resolution set before the compressed data amount determination. At step S163, again compression processing is performed and at step S166, whether or not the compressed data amount is equal to or less than the threshold value Th1 is determined. Thus, the resolution is converted into a lower resolution and again compression processing is performed until the compressed data amount becomes equal to or less than the threshold value Th1. For example, when the resolution of the input image information is 400 dpi, if the compressed data amount exceeds the threshold value Th1, the resolution of the first image plane is lowered to 200 dpi, for example. If the compressed data amount still exceeds the threshold value Th1, the resolution of the first image plane is lowered to 100 dpi, for example. The resolution is thus lowered, whereby the data amount can be decreased. When the compressed data amount becomes equal to or less than the threshold value Th1, the first image plane compressed at the time is input to the image format section 18.

Next, processing of the second image plane compressed in the second compression section 16 will be discussed. Basically, it is the same as the processing sequence from the first compression section 15 to the image format section 18. First, the second image plane compressed in the second compression section 16 is input to the second compressed data amount determination section 22, which at step S168 determines whether or not the compressed data amount of the second image plane is equal to or less than preset threshold value Th2. If the compressed data amount is equal to or less than the threshold value Th2 as a result of the determination, the second compressed data amount determination section 22 outputs the second image plane compressed to the image format section 18. If the compressed data amount exceeds the threshold value Th2, the second compressed data amount determination section 22 does not output the second image plane compressed and instructs the second resolution conversion section 13 to lower the second image plane resolution in resolution conversion processing. Upon reception of the instruction, at step S169 the second resolution conversion section 13 converts the second image plane into a lower resolution than the resolution set before the compressed data amount determination. At step S164, again compression processing is performed and at step S168, whether or not the compressed data amount is equal to or less than the threshold value Th2 is determined. Thus, the resolution is converted into a lower resolution and again compression processing is performed until the compressed data amount becomes equal to or less than the threshold value Th2. When the compressed data amount becomes equal to or less than the threshold value Th2, the second image plane compressed at the time is input to the image format section 18.

Thus, if the compressed data amount of the first or second image plane exceeds the predetermined compressed data amount, the first or second image plane is converted into a lower resolution, whereby the data amount is controlled, whereby data can be prepared in the multilayer data format considering the line capacity, the storage unit capacity, etc. The threshold values Th1 and Th2 may be determined considering the line capacity, the storage unit capacity, the image quality, etc., for example.

The selection image plane contains text or line drawing forms requiring high resolution if the image quality is considered. To prevent the image quality from being degraded, conversion to low resolution and recompression processing are not executed for the selection image plane. However, they may be executed for the selection image plane as required. In the example, the selection image plane provided by the image separation section 11 passes through the third resolution conversion section 14 without undergoing resolution conversion and is input to and compressed by the third compression section 17, then input to the image format section 18.

The three compressed image planes thus provided are input to the image format section 18, which at step S170, wraps the image planes in one data format and outputs the result as in the first and second embodiments.

As described above, in the third embodiment, the data amounts of the first and second image planes are controlled according to resolution, whereby the whole data amount can be controlled. Therefore, processing can be performed considering the storage unit capacity, the line capacity, etc.

In the third embodiment, the data amounts of the first and second image planes are controlled separately. However, for example, the sum total of the compressed data amount of the first image plane compressed in the first compression section 15 and that of the second image plane compressed in the second compression section 16 may be compared with a predetermined threshold value and either or both of the first resolution conversion section 12 and the second resolution conversion section 13 may execute conversion to lower resolution in response to the comparison result, then recompression may be executed. Also in this case, considering the selection image plane, the compressed data amount of the selection image plane may also be added to find the total data amount for determining the greater-than, equal-to, or less-than relation between the total data amount and a predetermined threshold value.

The configurations shown in the first to third embodiments can be used singly or in combination.

Some system configurations of image transmitting systems incorporating the first to third embodiments as application examples thereof are shown. Of course, the image processing systems shown in the first to third embodiments can be applied to various forms including image storage in an image filing system as well as the image transmitting systems.

Figure 13:
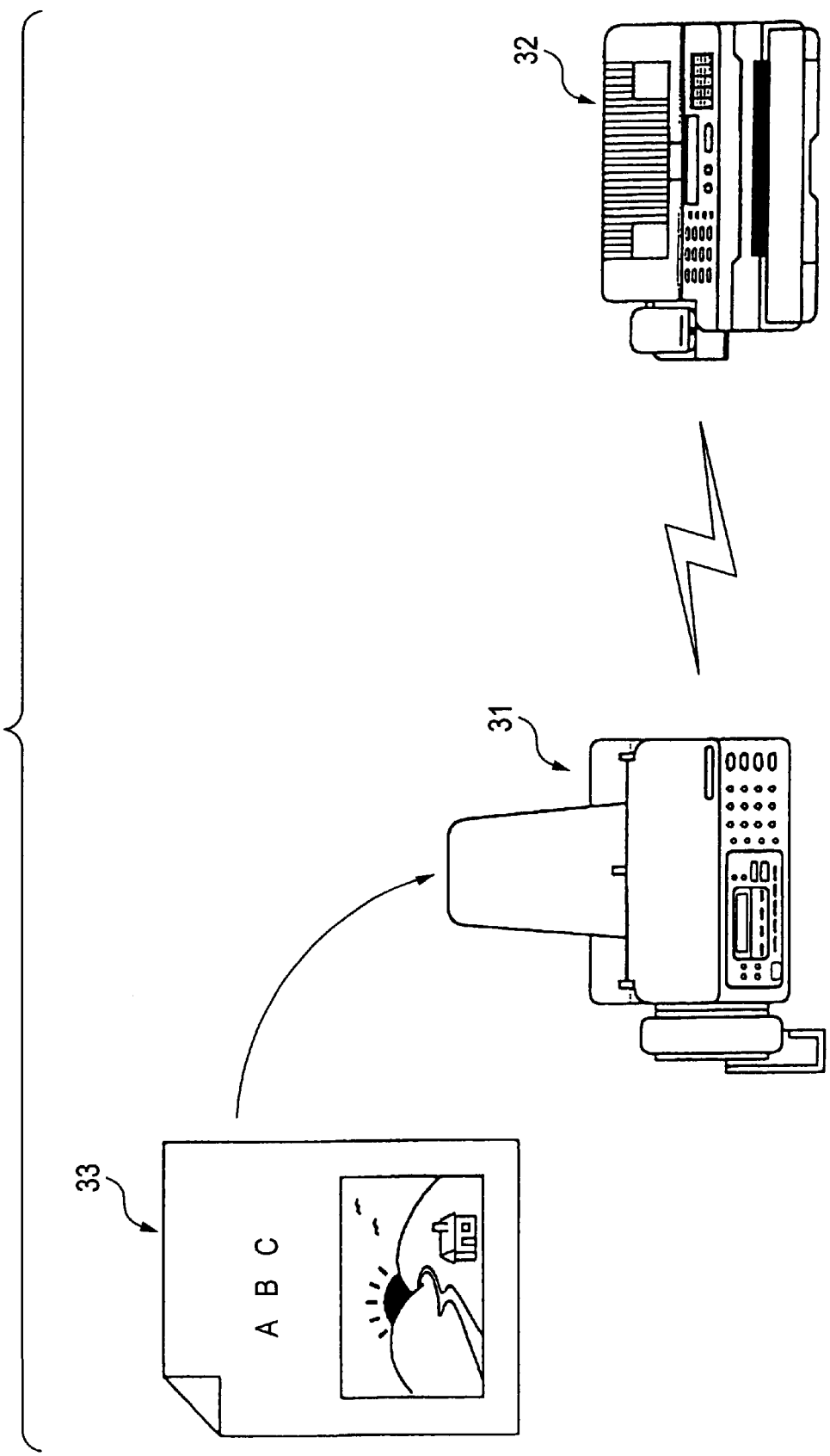
FIG. 13 is an illustration to show the configuration of a first application example of the image processing system of the invention.

FIG. 13 is an illustration to show the configuration of a first application example of the image processing system of the invention. In the figure, numeral 31 is an image transmitting system, numeral 32 is an image receiving system, and numeral 33 is an original image. The image transmitting system 31 comprises the image processing system of the invention as shown in the first to third embodiments. Like a normal monochrome facsimile, the image transmitting system 31 scans and inputs the color original image 33 and converts the image information input by the image processing system of the invention into the multilayer data format, then transmits the resultant image information over a line. At this time, resolution and the data amount are set according to the line capacity, etc., or resolution is set according to user's specification, whereby the image information can be transmitted in the optimum data amount with the optimum image quality maintained.

The image receiving system 32 reconstructs the image data in the multilayer data format sent from the image transmitting system 31 and outputs the image data. More particularly, three compressed image planes are taken out from the image data wrapped in a predetermined data format and are decoded, then the three image planes are matched in resolution and data of the first or second image plane is selected and output in response to the value for each pixel of the selection image plane, whereby the image data can be reconstructed.

Figure 14:
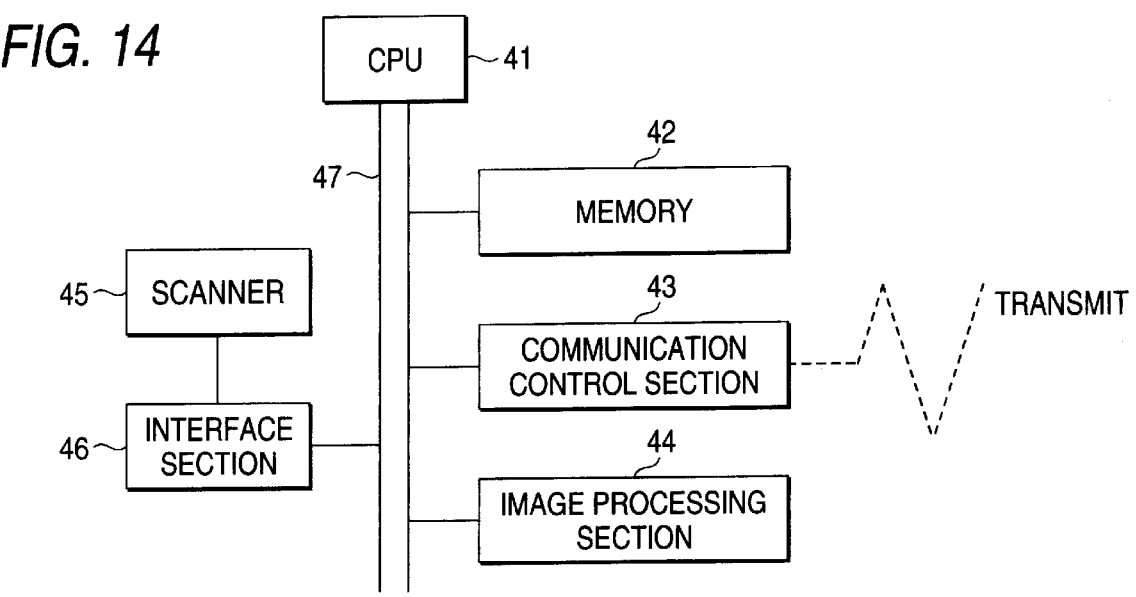
FIG. 14 is a block diagram to show an example of the internal configuration of an image transmitting system in the first application example of the image processing system of the invention.

FIG. 14 is a block diagram to show an example of the internal configuration of the image transmitting system in the first application example of the image processing system of the invention. In the figure, numeral 41 is a CPU (central processing system), numeral 42 is memory, numeral 43 is a communication control section, numeral 44 is an image processing section, numeral 45 is a scanner, numeral 46 is an interface section, and numeral 47 is a bus. The CPU 41 controls the entire image transmitting system. The memory 42 temporarily stores the image information input through the scanner 45, the image information in the multilayer data format provided by the image processing section 44, and the like. The memory 2 previously described with reference to FIG. 1, FIG. 5, or FIG. 11 can be formed of the memory 42. The communication control section 43 performs communication control between the image transmitting system 31 and the image receiving system 32 and transmits the image data in the multilayer data format. The image processing section 44 contains the multilayer data format conversion section 4 in the first to third embodiments of the image processing system of the invention and the resolution control section 3 in the first and second embodiments and converts the image information input through the interface section 46 from the scanner 45 into image data in the multilayer data format. The scanner 45 reads an original and inputs its image information. It corresponds to the scanner 1 previously described with reference to FIG. 1, FIG. 5, or FIG. 11. The interface section 46 is an interface for connecting the scanner 45 to the CPU 41. The bus 47 connects the CPU 41, the memory 42, the communication control section 43, the image processing section 44, and the interface section 46 in the image transmitting system.

Figure 15:
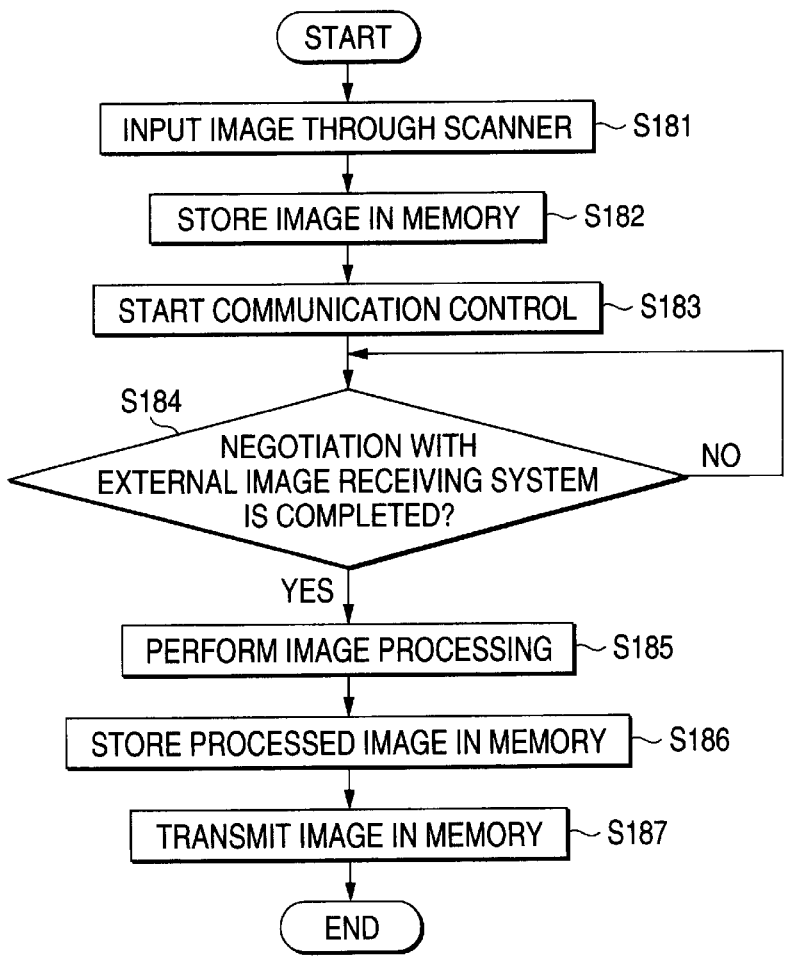
FIG. 15 is a flowchart to show an operation example of the image transmitting system in the first application example of the image processing system of the invention.

FIG. 15 is a flowchart to show an operation example of the image transmitting system in the first application example of the image processing system of the invention. First, at step S181, the scanner 45 is used to read the original image 33 to be transmitted. At this time, for example, if the configuration of the third embodiment of the image processing system of the invention is installed in the image processing section 44, the image processing section 44 sets the read resolution. At step S182, the read image information is stored in the memory 42 through the interface section 46 under the control of the CPU 41.

Subsequently, at step S183, control of communication with the image receiving system 32 is started under the control of the CPU 41. At this time, negotiation with the image receiving system 32 about the system environment is executed and the system environment information is managed in the CPU 41. At step S184, if it is determined that the negotiation is complete, control goes to step S185 at which the image processing section 44 converts the image information into the multilayer data format as described in the first to third embodiments of the image processing system of the invention. The image planes in the multilayer data format undergo proper resolution conversion in response to the transmission line capacity, the type of original image 33 to be transmitted, etc., and compression processing is performed.

The image data in the multilayer data format provided by the image processing section 44 is again stored in the memory 42 at step S186. The memory 42 may be provided with a capacity capable of storing image data before conversion and image data after conversion or may be provided with a capacity for storing image data under dynamic control of write and read.

When the CPU 41 recognizes that the image data converted into the multilayer data format is stored in the memory 42, it transmits the image data through the communication control section 43 at step S187 and terminates the processing. Since the transmitted image data in the multilayer data format is converted into the proper resolution responsive to the system environment and image quality requirement as described above, an image of high image quality can be transmitted at high speed.

Figure 16:
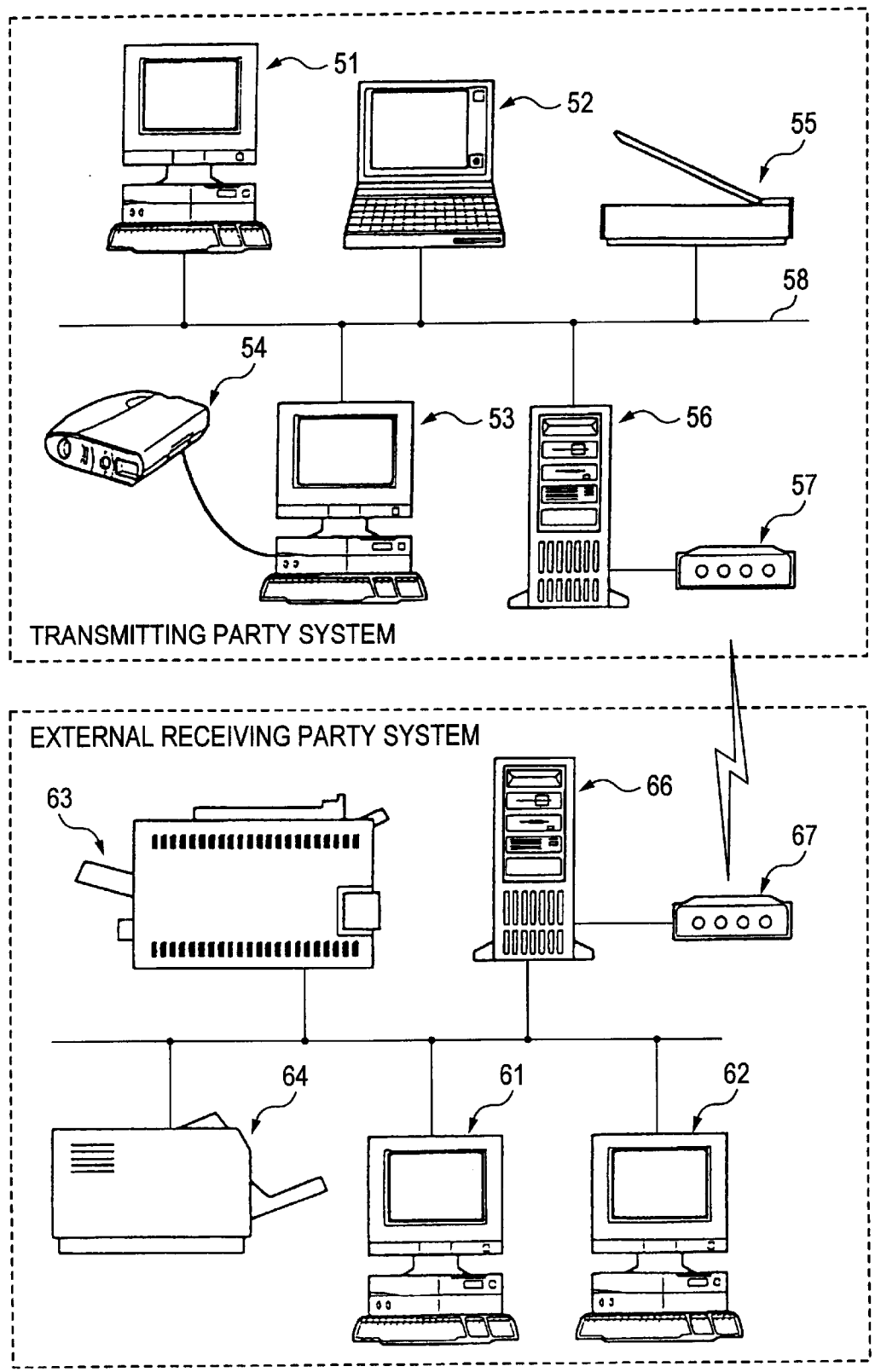
FIG. 16 is an illustration to show the configuration of a second application example of the image processing system of the invention.

FIG. 16 is an illustration to show the configuration of a second application example of the image processing system of the invention. In the figure, numerals 51–53 are host computers, numeral 54 is a digital camera, numeral 55 is a scanner, numeral 56 is a transmitting system, numeral 57 is a modem, numeral 58 is a transmitting party network, numerals 61 and 62 are client computers, numerals 63 and 64 are printers, numeral 65 is a receiving party network, numeral 66 is a receiving system, and numeral 67 is a modem. A transmitting party system comprises the host computers 51–53, the scanner 55, the transmitting system 56, etc. connected by the transmitting party network 58. The digital camera 54 is connected to the host computer 53 and the modem 57 is connected to the transmitting system 56.

For example, the transmitting system 56 comprises the configuration shown as the first to third embodiments of the image processing system of the invention. It receives image data directly from the host computers 51–53 and the scanner 55 connected on the transmitting party network 58 or via the host computer 53 from the digital camera 54 and performs processing of image separation, resolution conversion, compression, formatting, etc., then can transmit the image data in the multilayer data format by facsimile via the modem 57 to a receiving party system.

The receiving party system comprises the client computers 61 and 62, the printers 63 and 64, the receiving system 66, etc., connected by the receiving party network 65. The receiving system 66, to which the modem 67 is connected, can receive fax image data sent over a communication line through the modem 67.

The receiving system apparatus 66 generates an image from the image data in the multilayer data format received at the modem 67 and outputs the image to the printer 63 or 64, or performs necessary processing by the client computer 61 or 62, then can output the image from the printer 63 or 64.

Figure 17:
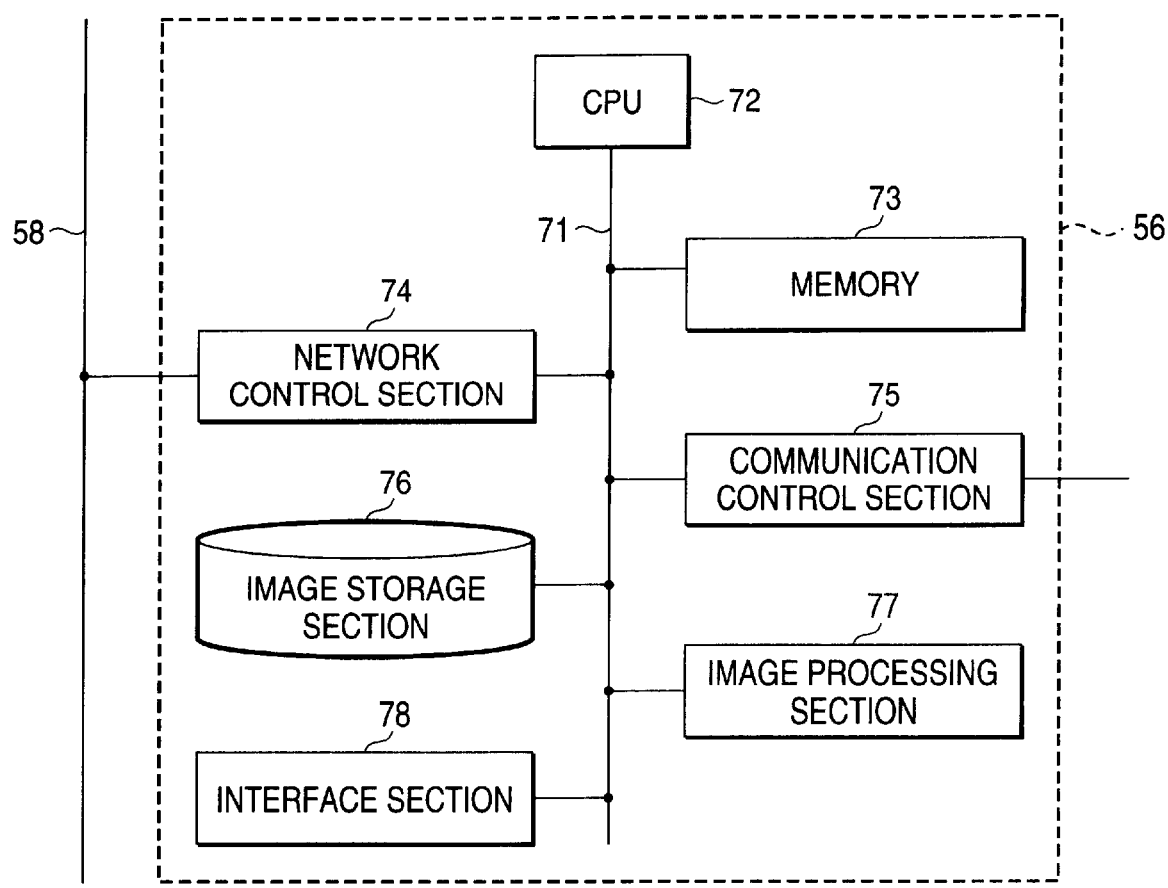
FIG. 17 is a block diagram to show an example of the internal configuration of the transmitting system in the second application example of the image processing system of the invention.

FIG. 17 is a block diagram to show an example of the internal configuration of the transmitting system in the second application example of the image processing system of the invention. In the figure, numeral 71 is an internal bus, numeral 72 is a CPU, numeral 73 is memory, numeral 74 is a network control section, numeral 75 is a communication control section, numeral 76 is an image storage section, numeral 77 is an image processing section, and numeral 78 is an interface section. The transmitting system 56 shown in FIG. 17 comprises the CPU 72, the memory 73, the network control section 74, the communication control section 75, the image storage section 76, the image processing section 77, the interface section 78, etc., connected by the internal bus 71.

The CPU 72 controls the transmitting system 56. The memory 73 temporarily stores image data. The network control section 74 receives image data from the host computers 51–53 and the scanner 55 through the network 58 or transmits image data to the host computers 51–53 through the network 58. The communication control section 75 transmits image data by fax through the modem, etc., connected to the outside. As shown in FIG. 16, a communication line such as a general telephone line is furthermore connected to the modem for communication and image data can be transmitted by fax over the communication line. The image storage section 76 stores image data. The image processing section 77 incorporates the first to third embodiments of the image processing system of the invention and converts the image information received through the network control section 74 into image data in the multilayer data format using the resolution responsive to the line capacity and the machine capability. The interface section 78 is an interface used for connecting an image input machine such as a scanner or a digital camera directly to the transmitting system 56.

Figure 18:
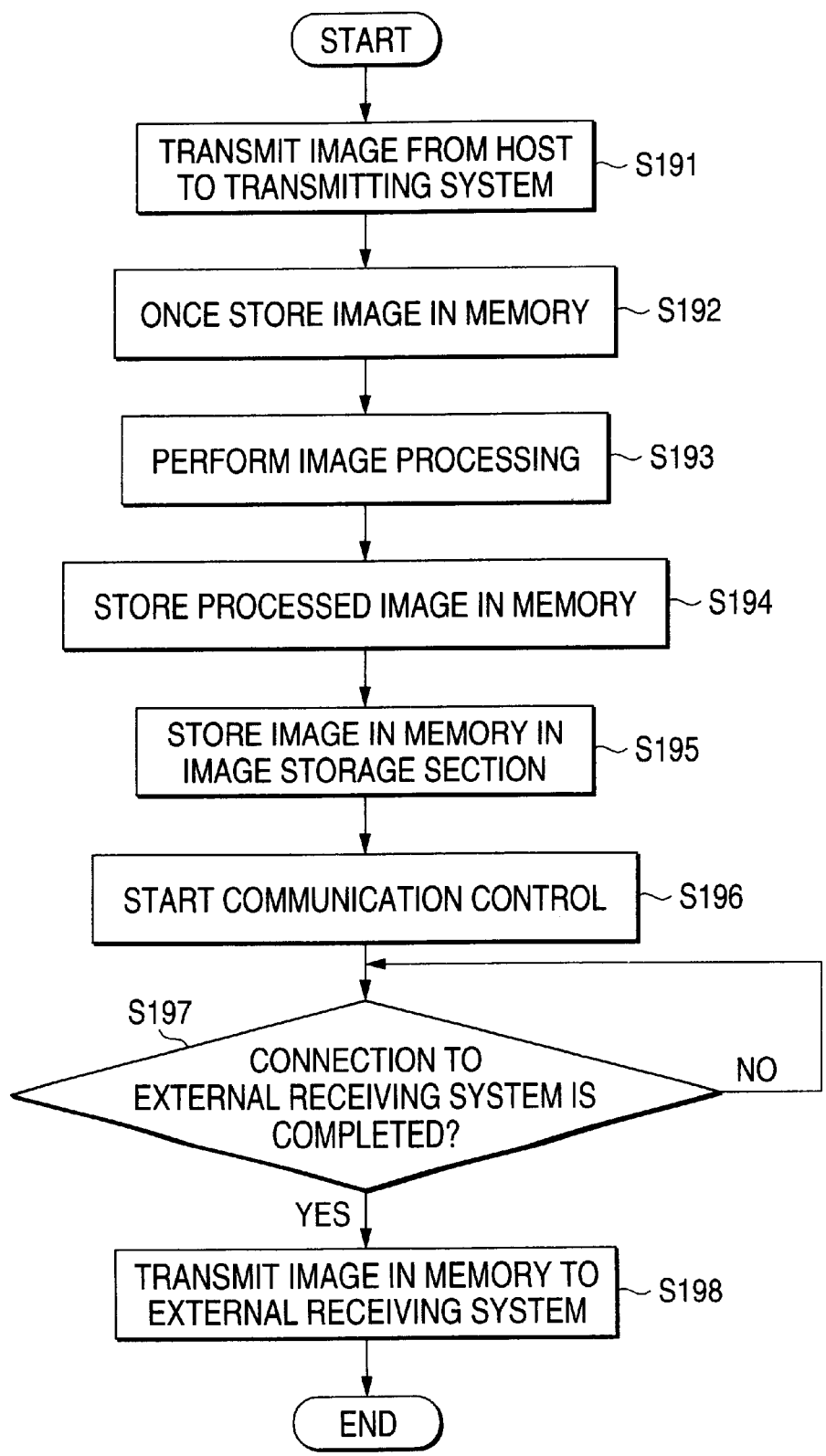
FIG. 18 is a flowchart to show an operation example in the second application example of the image processing system of the invention.

FIG. 18 is a flowchart to show an operation example in the second application example of the image processing system of the invention. FIG. 18 shows an operation flow from preparation of an image by the host computer 51–53 or image read through the scanner 55 or the digital camera 54 to image processing to fax transmission. First, at step S191, one of the host computers 51–53 and the scanner 55 connected to the network 58 requests the transmitting system 56 to transmit an image and transmits the image thereto.

Upon reception of the request through the network control section 74, the transmitting system 56 sets predetermined parameters in a DMAC (Direct Memory Access Controller) register (not shown) by the CPU 72. The parameters may include the data storage address in the memory 73, the transfer rate, etc. Upon completion of setting the parameters, the CPU 72 issues a command indicating a ready state to the network control section 74, then at step S192, stores image information transmitted in sequence from any of the host computers 51–53 or the scanner 55 in the memory 73.

If the configuration shown in the first embodiment of the image processing system of the invention is contained as the image processing section 77, resolution information is sent to the host computer 51–53 or the scanner 55 transmitting the request through the network control section 74 at the parameter setting time. The host computer 51–53, which receives the resolution information, prepares image information in accordance with the received resolution, or the scanner 55, which receives the resolution information, scans an original image at the received resolution and reads its image information. This is also applied if the host computer 53 reads an image through the digital camera 54. The image information conforming to the resolution sent from the transmitting system 56 is stored in the memory 73.

If the configuration shown in the second embodiment of the image processing system of the invention is contained as the image processing section 77, the user specifies the transmission image quality, the transmission original type, etc., before control goes to step S193. The user interface section 5 shown in FIG. 5 may be placed in the host computers 51–53, the digital camera 54, or the scanner 55 in addition to the transmitting system 56. If the user interface section 5 is placed in the machine other than the transmitting system 56, information of the transmission image quality, the transmission original type, etc., specified by the user is transmitted to the transmitting system 56 at the parameter setting time.

When all image information is stored in the memory 73, the CPU 72 sets parameters such as the image read address and the write address of the processed image data in the multilayer data format in the DMAC register and reads the image information in the memory 73 in sequence, then sends the image information to the image processing section 77. At step S193, the image processing section 77 performs the processing described in the first to third embodiments and outputs the image data in the multilayer data format.

For example, if the image processing section 77 comprises the first embodiment of the image processing system of the invention, it separates the sent image information into image planes, converts the image planes into the standard resolutions set by the resolution control section 3, compresses and formats the data, and outputs the image data in the multilayer data format. If the image processing section 77 comprises the second embodiment of the image processing system of the invention, the resolution control section 3 sets the resolutions responsive to the transmission image quality and the transmission original type specified by the user and the image processing section 77 separates the sent image information into image planes, converts the image planes into the resolutions set by the resolution control section 3, compresses and formats the data, and outputs the image data in the multilayer data format. Further, if the image processing section 77 comprises the third embodiment of the image processing system of the invention, it separates the sent image information into image planes, performs compression processing, determines the greater-than, equal-to, or less-than relation between the compressed data amount and a predetermined amount, if the compressed data amount is greater than the predetermined amount, converts the data into a lower resolution, again compresses the data, and repeats the process until the compressed data amount becomes equal to or less than the predetermined amount, then formats the data and outputs the image data in the multilayer data format.

At step S194, the image data converted into the multilayer data format is stored in the memory 73 in sequence starting at the write address preset in the DMAC register. The memory 73 may be provided with a capacity capable of storing image data before conversion and image data after conversion or may be provided with a capacity for storing larger image data under dynamic control of write and read. At step S195, the image data in the multilayer data format stored in the memory 73 is stored in the image storage section 76 in sequence for saving.

Upon completion of storing the image data in the multilayer data format, control goes to step S196 at which the CPU 72 starts communication to the receiving party system previously specified. Detailed protocol will not be discussed here. At step S197, if it is determined that connection to the receiving party system is complete, control goes to step S198 at which the image data in the multilayer data format stored in the memory 73 is read in sequence and is transmitted to the receiving party system.

The processing makes it possible to convert the image information sent from the host computer 51–53 or the scanner 55 into the image data in the multilayer data format and transmit the image data by fax to the receiving party system. Alternatively, the image data in the multilayer data format stored in the memory 73 may be read in sequence and sent to the host computer 51–53 through the network control section 74. To convert into the image data in the multilayer data format, resolutions are set considering the line capacity, the machine capability, etc., so that conversion to a proper data amount of image data with the image quality maintained. Thus, unnecessarily long communication time is not taken and the image quality is not lowered unnecessarily either; the image data can be transmitted in response to the environment.

In the receiving party system, the receiving system 66 reconstructs the image based on the fax image data received at the modem 67. It takes out the first image plane, second image plane and selection image plane compressed from the image data formatted in the multilayer data format and decodes the planes, then adjusts the resolutions and selects and outputs the data of either the first or second image plane according to the data of the selection image plane, thereby reconstructing the image information.

The reconstructed image information undergoes image processing as required and can be stored intact or output from the printer 63 or 64 under the control of the client computer 61 or 62.

Figure 19:
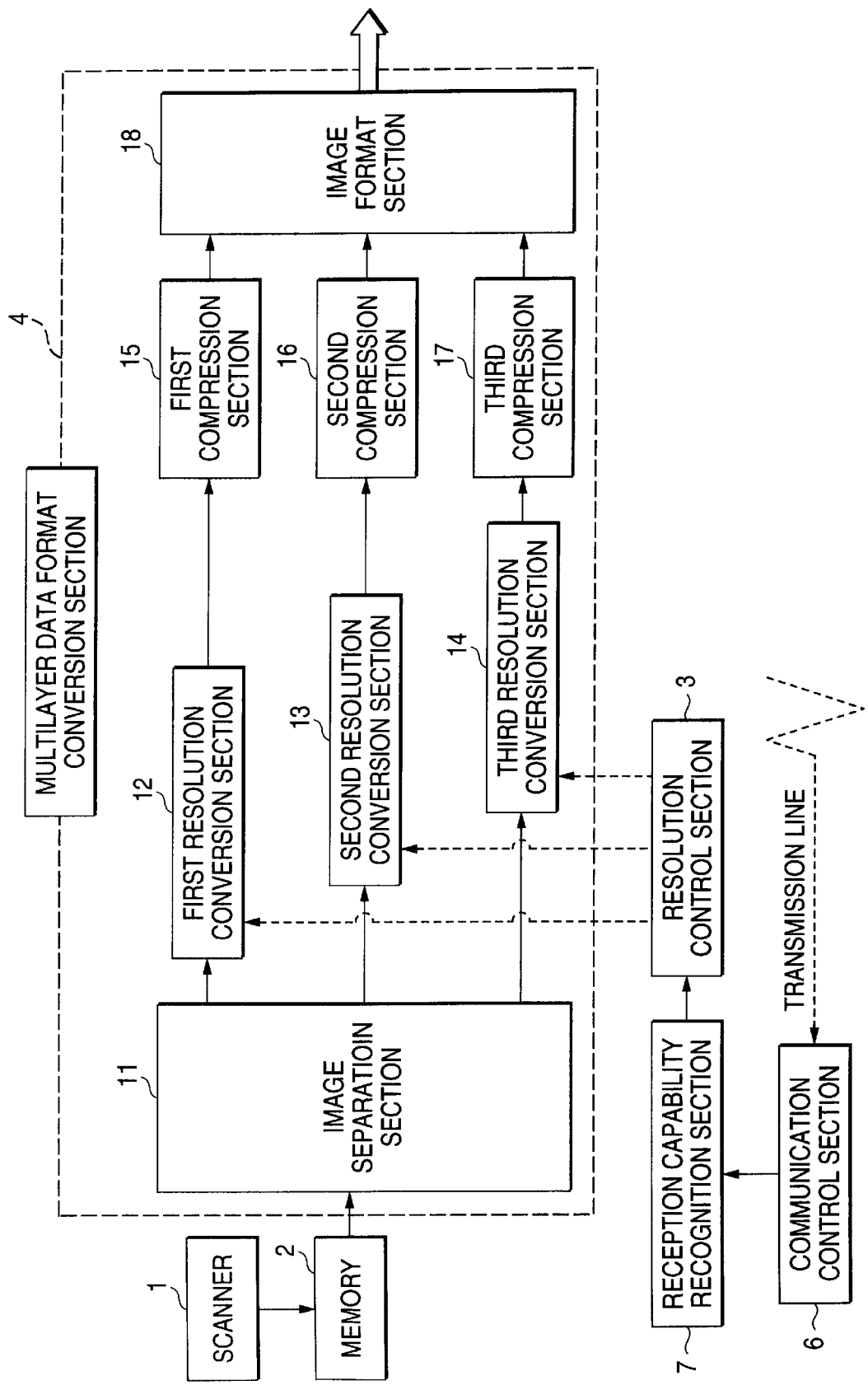
FIG. 19 is a block diagram to show one embodiment of an image transmitting system of the invention.

In the first to third embodiments of the image processing system of the invention, resolutions used in conversion processing to the multilayer data format are preset and the setup standard resolutions are used or the resolutions set in response to the user's specification are selectively used or resolution is automatically set in response to the compressed data amount. To transmit the image data converted into the multilayer data format over a transmission line as shown in the first and second application examples, the resolutions used in conversion processing to the multilayer data format can be determined furthermore in response to the system capability of a receiving party, an example of which will be discussed below:

FIG. 19 is a block diagram to show one embodiment of an image transmitting system of the invention. Parts identical with or similar to those previously described with reference to FIG. 1 are denoted by the same reference numerals in FIG. 19 and will not be discussed again. In FIG. 19, numeral 6 is a communication control section and numeral 7 is a reception capability recognition section. The image transmitting system can be applied to the image transmitting system 31 in the first application example previously described with reference to FIG. 13 or the transmitting system 56 in the second application example previously described with reference to FIG. 16. More particularly, a resolution control section 3, a multilayer data format conversion section 4, and the reception capability recognition section 7 shown in FIG. 19 may be contained as the image processing sections 44 and 47 in the first application example shown in FIG. 14 and the second application example shown in FIG. 17, and a communication control section 6 shown in FIG. 19 may be contained as the communication control sections 43 and 75.

The communication control section 6 performs communication control between the transmitting system and a receiving system. It performs negotiation processing before an image is transmitted, gets information concerning the reception capability of the receiving system, and passes the information to the reception capability recognition section 7, which then recognizes the highest resolution at which the receiving system can receive an image from the information concerning the reception capability of the receiving system passed from the communication control section 6. The resolution control section 3 sets the resolutions to convert into in a first resolution conversion section 12, a second resolution conversion section 13, and a third resolution conversion section 14 based on the highest resolution at which the receiving system can receive an image, recognized by the reception capability recognition section 7. The resolutions into which the three image planes are to be converted are determined so as to become optimum for the receiving system by the negotiation with the receiving system before an image is transmitted.

Figure 20:
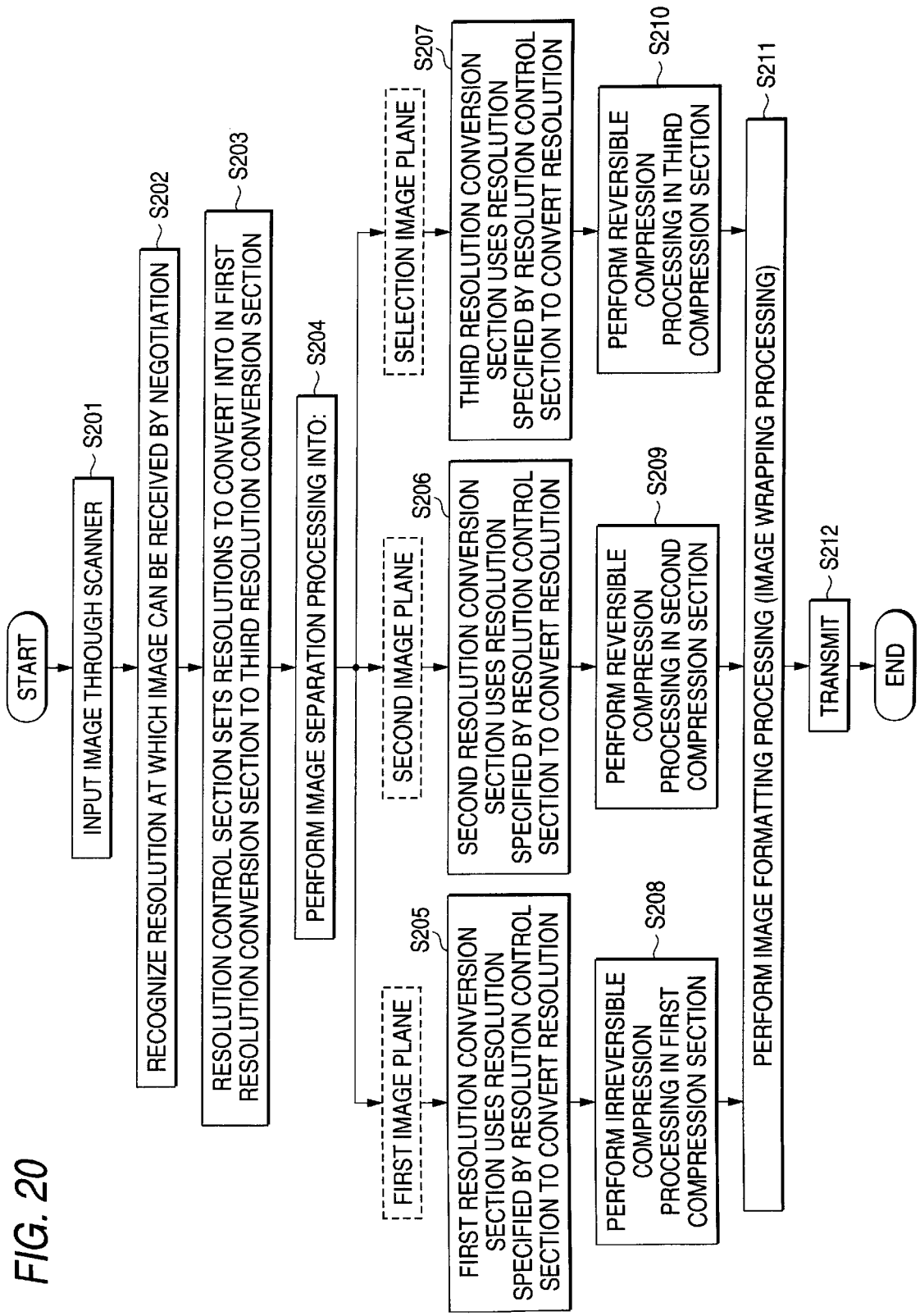
FIG. 20 is a flowchart to show an operation example in the embodiment of the image transmitting system of the invention.

FIG. 20 is a flowchart to show an operation example in the embodiment of the image transmitting system of the invention. First, at step S201, image information is input through a scanner 5. Of course, it may be input from any other image input machine such as a digital camera or may be sent from an image input machine, a computer, etc., via a network or a line, as shown in the first and second application examples. In the embodiment, the input image information is once stored in memory 2. Of course, it may be input to the multilayer data format conversion section 4 as it is.

Subsequently, as step S202, the communication control section 6 performs communication control with the receiving system and the reception capability recognition section 7 recognizes the highest resolution at which the receiving system can receive an image. At step S203, the resolution control section 3 sets the resolutions to convert into in the first resolution conversion section 12, the second resolution conversion section 13, and the third resolution conversion section 14 based on the highest resolution at which the receiving system can receive an image, recognized at step S202.

Figure 21:
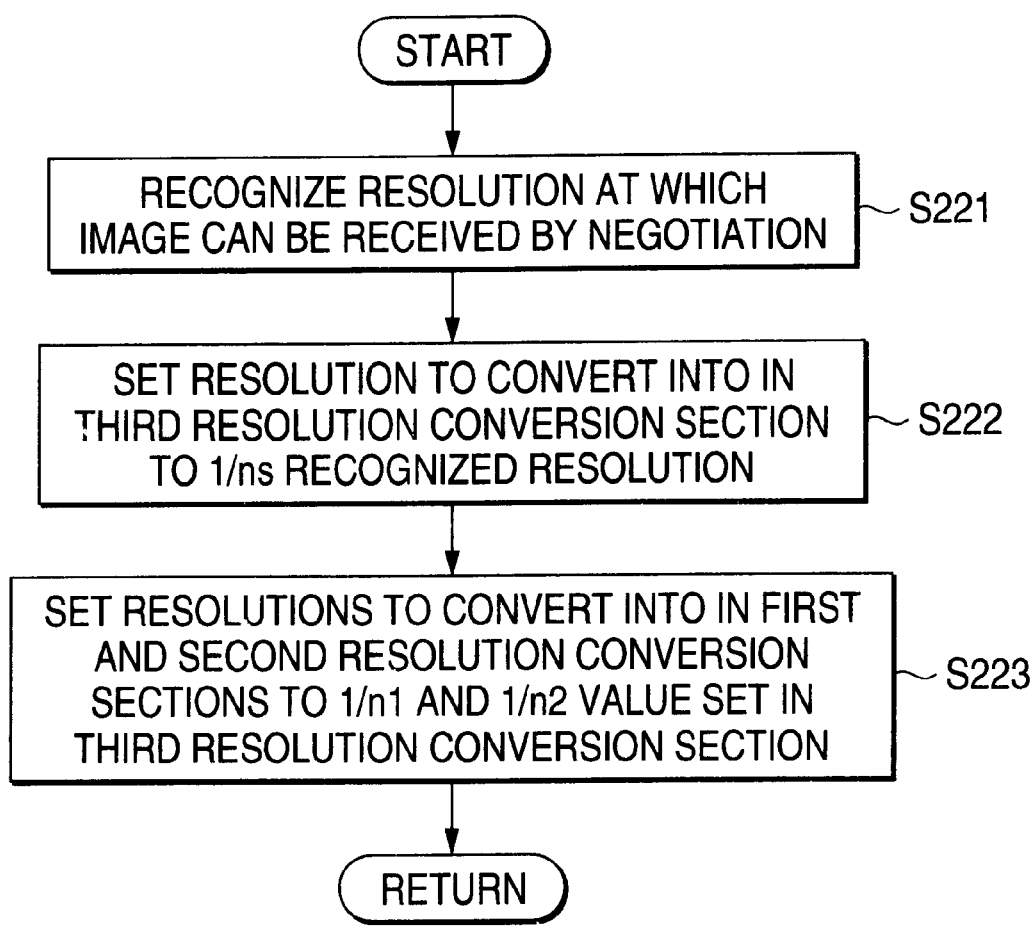
FIG. 21 is a flowchart to show an example of determination processing of the resolutions to convert into in the embodiment of the image transmitting system of the invention.

The processing at steps S202 and S203 is shown in detail in FIG. 21, which is a flowchart to show an example of determination processing of the resolutions to convert into in the embodiment of the image transmitting system of the invention. At step S211, as at step S202, negotiation with the receiving system is executed and the highest resolution at which the receiving system can receive an image is recognized, then at steps S222 and S223, the resolutions to convert into are set. First, at step S222, the resolution of the selection image plane (containing text or line drawing forms) prepared by the transmitting party is set to 1/ns the highest resolution at which the receiving party can receive an image (where ns is a natural number). At step S323, the resolutions of the first and second image planes prepared by the transmitting party are set to 1/n1 and 1/n2 the resolution of the selection image plane respectively (where 1/n1 and 1/n2 are each a natural number and n1 may equal n2).

For example, assuming that the highest resolution at which the receiving party can receive an image is 200 dpi and that ns=1 at step S222, the selection image plane is prepared at the resolution equivalent to the highest resolution at which the receiving system can receive an image, namely, 200 dpi; the text or line drawing portion can be transmitted at the resolution making the most of the capability of the receiving system. If n1=n2=2 at step S223 under the condition, a half the selection image plane resolution 200 dpi, namely, 100 dpi becomes the resolutions of the first and second image planes.

Thus, basically it is desirable to determine ns considering the image quality of the text or line drawing part and further determine n1 and n2 so that the resolutions of the first and second image planes become equal to or less than the selection image plane resolution determined by ns, but the invention is not limited to it and the values of ns, n1, and n2 may be set as desired. Particularly, the values of ns, n1, and n2 are set in response to the line capacity limitation, system limitation, image plane natures, etc., whereby the resolution fitted to the image data transmission environment can be set.

Thus, if the performance of the receiving resolution of the associated receiving system is recognized by negotiation therewith and the resolutions into which the image planes are to be converted by the first to third resolution conversion sections 12–14 are determined, transmission processing with no waste can be performed matching the performance of the receiving system, so that the image quality is not degraded and efficient image transmission can be executed.

Referring again to FIG. 20, processing at step S204 and the later is similar to the operation example of the first embodiment of the image processing system of the invention and therefore will be discussed briefly. After the resolutions to convert into are set in the first to third resolution conversion sections 12–14, the image separation section 11 separates the input image information into three image planes at step S204. Then, at steps S205 to S207, the three image planes provided at step S204 are converted into the resolutions set at step S203. Further, at steps S208 to S210, a first compression section 15, a second compression section 16, and a third compression section 17 compresses the first image plane, the second image plane, and the selection image plane respectively. Last at step S211, an image format section 18 wraps the three compressed image planes in one data format. The image data in the multilayer data format thus prepared is once stored in the memory, then transmitted to the receiving system or directly at step S212, transmitted to the receiving system.

Thus, in the embodiment of the image transmitting system, first the resolution at which the receiving system can receive an image is recognized by negotiation with the receiving system and the resolutions of the image planes can be set based on the recognized resolution in the system configuration as shown in the first or second application example, so that the text image quality and the picture image quality can always be fitted to the capability of the receiving party, whereby transmission adjusted to the capability of the receiving party is enabled.

As seen from the description made so far, according to the invention, for transmitting or storing an image with a mixture of color text or line drawing and picture such as a photo, optimum resolutions can be set and conversion to image data in the multilayer data format can be executed in response to the image quality, the original type, the system environment of the memory capacity, etc., and if an image is transmitted, the line transmission capacity environment, the reception capability of a receiving system, etc. Particularly, for image data in the multilayer data format, resolution can be set separately for each image plane and the image data can be converted matching the environment and can be transmitted or stored with high image quality as compared with the image data handled in the conventional system.

What is claimed is:

1. An image processing system comprising:

memory means, input means for inputting image information, multilayer data format conversion means for outputting the image information input through said input means in a multilayer data format consisting of a first piece of image data, a second piece of image data, and selection data for selecting either the first piece of image data or the second piece of image data, and resolution control means for setting each output resolutions for the first piece of image data, the second piece of image data, and the selection data output from said memory means, wherein said multilayer data format conversion means performs conversion processing in accordance with the resolutions set by said resolution control means.

2. The image processing system of claim 1, wherein said input means scans an original image in accordance with the resolution of the selection data set by said resolution control means and inputs the image information.

3. The image processing system of claim 1, wherein said multilayer data format conversion means comprises:

resolution conversion means for executing resolution conversion, as required, for the first piece of image data, the second piece of image data, and the selection data based on the resolutions set by said resolution control means.

4. The image processing system of claim 1, further comprising:

image quality specification means for a user to specify image quality applied when an image is output, wherein if high image quality than standard resolution is specified on said image quality specification means, said resolution control means sets resolutions so as to output the selection data at higher resolution than standard resolution.

5. The image processing system of claim 1, further comprising:

type specification means for a user to specify the type of image represented by the image information input through said input means, wherein if the type of image represented by the image information is specified as text on said type specification means, said resolution control means sets resolutions so as to output the selection data at higher resolution than standard resolution.

6. The image processing system of claim 1, further comprising:

type specification means for a user to specify the type of image represented by the image information input through said input means, wherein if the type of image represented by the image information is specified as picture on said type specification means, said resolution control means sets resolutions so as to output the first piece of image data containing a picture portion in the image information at higher resolution than standard resolution.

7. An image transmitting system comprising:

memory means, input means for inputting image information, multilayer data format conversion means for outputting the image information input through said input means in a multilayer data format consisting of a first piece of image data, a second piece of image data, and selection data for selecting either the first piece of image data or the second piece of image data, communication control means for performing communication control between said image transmitting system and an external image receiving system and getting at least information concerning a reception capability of the external receiving system, reception capability recognition means for recognizing the reception capability of the external receiving system for receiving the image information in the multilayer data format output from said multilayer data format conversion means from the information concerning the reception capability gotten by said communication control means, and resolution control means for determining transmission resolution based on the reception capability of the external receiving system recognized by said reception capability recognition means and setting the resolution of the selection data in said multilayer data format conversion means to the transmission resolution.

8. The image transmitting system of claim 7, wherein said input means scans an original image in accordance with resolution of the selection data set by said resolution control means and inputs the image information.

9. The image transmitting system of claim 7, wherein said resolution control means sets resolutions of the first piece of image data and the second piece of image data in response to the resolution of the selection data, and said multilayer data format conversion means comprises resolution conversion means for executing resolution conversion, as required, for the first piece of image data, the second piece of image data, and the selection data based on the resolutions of the selection data, the first piece of image data, and the second piece of image data set by said resolution control means.

10. An image transmitting system comprising:

memory means, input means for inputting image information, multilayer data format conversion means for outputting the image information input through said input means in a multilayer data format consisting of first piece of image data, second piece of image data, and selection data for selecting either the first piece of image data or the second piece of image data, communication control means for performing communication control between said image transmitting system and an external image receiving system and getting at least information concerning a reception capability of the external receiving system, reception capability recognition means for recognizing the highest resolution at which the external receiving system for receiving the image information in the multilayer data format output from said multilayer data format conversion means can receive the image information from the information concerning the reception capability gotten by said communication control means, and resolution control means for setting the resolution of the selection data in said multilayer data format conversion means to resolution equal to or less than the highest resolution of the external receiving system recognized by said reception capability recognition means.

11. The image transmitting system of claim 10, wherein said resolution control means sets the resolution of the selection data to 1/ns the highest resolution of the external receiving system where ns is a natural number.

12. The image transmitting system of claim 10, wherein said resolution control means sets the resolutions of the first piece of image data and the second piece of image data in said multilayer data format conversion means to 1/n1 and 1/n2 the resolution of the selection data where n1 and n2 are each a natural number.

13. An image processing system comprising:

memory means, input means for inputting image information, separation means for separating the image information input through said input means into a first piece of image data, a second piece of image data, and selection data for selecting either the first piece of image data or the second piece of image data, resolution conversion means for executing resolution conversion, as required, for the first piece of image data, the second piece of image data, and the selection data provided by said separation means, compression means for compressing the first piece of image data, the second piece of image data, and the selection data output from said resolution conversion means, and compressed data amount determination means for comparing compressed data amounts of the first piece of image data and the second piece of image data compressed by said compression means with each preset threshold value and instructing said resolution conversion means to convert the data determined to have the compressed data amount greater than the threshold value into a lower resolution for recompressing the data.

14. An image processing system comprising:

memory means, input means for inputting image information, separation means for separating the image information input through said input means into a first piece of image data, a second piece of image data, and selection data for selecting either the first piece of image data or the second piece of image data, resolution conversion means for executing resolution conversion, as required, for the first piece of image data, the second piece of image data, and the selection data provided by said separation means, compression means for compressing the first piece of image data, the second piece of image data, and the selection data output from said resolution conversion means, and compressed data amount determination means for calculating a sum of compressed data amounts of at least the first piece of image data and the second piece of image data compressed by said compression means and comparing the sum with a preset threshold value, if the sum of the compressed data amounts is determined greater than the threshold value, said compressed data amount determination means for instructing said resolution conversion means to convert at least the first piece of image data and the second piece of image data into lower resolution for recompressing the first piece of image data and the second piece of image data.

15. An image processing method comprising the steps of:

presetting resolutions of a first piece of image data, a second piece of image data, and selection data for selecting either the first piece of image data or the second piece of image data, scanning an original image in accordance with the preset resolution of the selection data, inputting image information, and separating the input image information into the first piece of image data, the second piece of image data, and the selection data.

16. An image processing method comprising the steps of:

presetting resolutions of a first piece of image data, a second piece of image data, and selection data for selecting either the first piece of image data or the second piece of image data in response to user-specified image quality and image type, separating input image information into the first piece of image data, the second piece of image data, and the selection data, and converting the first piece of image data, the second piece of image data, and the selection data into their respective preset resolutions as required.

17. The image processing method of claim 16, wherein if the user specifies high image quality, the resolution of the selection data is set higher than standard resolution.

18. The image processing method of claim 16, wherein if the user specifies the image type as text, the resolution of the selection data is set higher than standard resolution.

19. The image processing method of claim 16, wherein if the user specifies the image type as picture, the resolution of the first piece of image data containing a picture portion in the image information is set higher than standard resolution.

20. An image transmitting method comprising the steps of:

getting information concerning a reception capability of an external receiving system for receiving image information in a multilayer data format consisting of a first piece of image data, a second piece of image data, and selection data for selecting either the first piece of image data or the second piece of image data, determining transmission resolution from the gotten information concerning the reception capability, scanning an original image in accordance with the determined transmission resolution, inputting image information, and separating the input image information into the first piece of image data, the second piece of image data, and the selection data.

21. An image transmitting method comprising the steps of:

getting information concerning a reception capability of an external receiving system for receiving image information in a multilayer data format consisting of a first piece of image data, a second piece of image data, and selection data for selecting either the first piece of image data or the second piece of image data, determining transmission resolution from the gotten information concerning the reception capability, separating input image information into the first piece of image data, the second piece of image data, and the selection data, and executing resolution conversion, as required, for the first piece of image data, the second piece of image data, and the selection data based on the transmission resolution.

22. The image transmitting method of claim 21, wherein the resolution of the selection data is set to resolution equal to or less than the highest resolution at which the external receiving system can receive image information.

23. The image transmitting method of claim 21, wherein the resolution of the selection data is set to 1/ns (where ns is a natural number) the highest resolution at which the external receiving system can receive image information.

24. The image transmitting method of claim 22, wherein the resolutions of the first piece of image data and the second piece of image data are set to 1/n1 and 1/n2 (where n1 and n2 are each a natural number) the resolution of the selection data.

25. An image processing method comprising the steps of:

separating input image information into a first piece of image data, a second piece of image data, and selection data for selecting either the first piece of image data or the second piece of image data, executing resolution conversion, as required, for the first piece of image data, the second piece of image data, and the selection data, compressing the data, comparing compressed data amounts of the first piece of image data and the second piece of image data compressed with preset threshold values, converting the data determined to have the compressed data amount greater than the threshold value into a lower resolution, and recompressing the data.

26. An image processing method comprising the steps of:

separating input image information into a first piece of image data, a second piece of image data, and selection data for selecting either the first piece of image data or the second piece of image data, executing resolution conversion, as required, for the first piece of image data, the second piece of image data, and the selection data, compressing the data, calculating a sum of compressed data amounts of at least the first piece of image data and the second piece of image data compressed, comparing the sum of the compressed data amounts with a preset threshold value, if the sum of the compressed data amounts is determined greater than the threshold value, converting at least the first piece of image data and the second piece of image data into lower resolution, and recompressing the first piece of image data and the second piece of image data.

* * * * *